(12) United States Patent
Matsumoto et al.

(10) Patent No.: US 9,452,650 B2
(45) Date of Patent: Sep. 27, 2016

(54) VEHICULAR ARM COMPONENT AND MANUFACTURING METHOD THE SAME

(71) Applicant: Yorozu Corporation, Yokohama (JP)

(72) Inventors: Masaharu Matsumoto, Yokohama (JP); Yoshiki Miyachi, Yokohama (JP)

(73) Assignee: Yorozu Corporation, Yokohama (JP)

( * ) Notice: Subject to any disclaimer, the term of this patent is extended or adjusted under 35 U.S.C. 154(b) by 0 days.

(21) Appl. No.: 14/424,619

(22) PCT Filed: Aug. 30, 2013

(86) PCT No.: PCT/JP2013/073400
§ 371 (c)(1),
(2) Date: Feb. 27, 2015

(87) PCT Pub. No.: WO2014/034885
PCT Pub. Date: Mar. 6, 2014

(65) Prior Publication Data
US 2015/0224842 A1 Aug. 13, 2015

(30) Foreign Application Priority Data

Aug. 31, 2012 (WO) .................. PCT/JP2012/072253

(51) Int. Cl.
*B60G 7/00* (2006.01)
*B21D 53/88* (2006.01)
(Continued)

(52) U.S. Cl.
CPC .............. *B60G 7/001* (2013.01); *B21D 5/015* (2013.01); *B21D 53/88* (2013.01); *B60G 7/00* (2013.01);
(Continued)

(58) Field of Classification Search
CPC .............. B60G 7/001; B60G 2206/11; B60G 2206/16; B60G 2206/8103; B60G 2206/722; B21D 53/88; F16C 7/08; Y10T 29/49622
See application file for complete search history.

(56) References Cited

U.S. PATENT DOCUMENTS

| 2009/0277010 A1* | 11/2009 | Runte | B21D 53/88 29/897.2 |
| 2011/0285102 A1* | 11/2011 | Yu | B60G 7/001 280/124.134 |
| 2014/0008886 A1* | 1/2014 | Ueno | B60G 7/001 280/124.1 |

FOREIGN PATENT DOCUMENTS

| JP | 07060384 A | 3/1995 |
| JP | H08127211 A | 5/1996 |

(Continued)

OTHER PUBLICATIONS

International Search Report for PCT/JP2013/073400 mailed Oct. 8, 2013.
(Continued)

*Primary Examiner* — Faye M Fleming
(74) *Attorney, Agent, or Firm* — Drinker Biddle & Reath LLP

(57) ABSTRACT

[Problem] To provide a vehicular arm component which is easily manufactured and advantageous in reducing a cost without causing a steep change in a cross section.
[Solution] A vehicular arm component is formed by subjecting a workpiece (W), the workpiece being a flat plate extending in a plane formed by a first direction and a second direction orthogonal to the first direction, to press processing in stages so as to butt and joint two side surfaces in the second direction. The vehicular arm component includes: a cylindrical portion (10) configured to be provided along the first direction and have a cylindrical shape; a bracket portion (20) configured to be provided in either end in the first direction of the cylindrical portion and have an outer diameter expanding as it goes to the outside in the first direction; and two flange portions (30) configured to be provided to face each other along the second direction in the bracket portion and provided with through holes (20H) at positions facing each other along the second direction.

21 Claims, 32 Drawing Sheets

(51) Int. Cl.
   *B21D 5/01*   (2006.01)
   *B60G 9/04*   (2006.01)
   *G05G 1/30*   (2008.04)

(52) U.S. Cl.
   CPC *B60G 9/04* (2013.01); *G05G 1/30* (2013.01); *B60G 2206/012* (2013.01); *B60G 2206/10* (2013.01); *B60G 2206/11* (2013.01); *B60G 2206/722* (2013.01); *B60G 2206/811* (2013.01); *B60G 2206/8102* (2013.01); *B60G 2206/8103* (2013.01); *B60G 2206/8105* (2013.01); *B60G 2206/82* (2013.01); *Y10T 29/49622* (2015.01)

(56) References Cited

FOREIGN PATENT DOCUMENTS

| | | |
|---|---|---|
| JP | H09109638 A | 4/1997 |
| JP | 2001047127 A | 2/2001 |
| JP | 2002098132 A | 4/2002 |
| JP | 2008195155 A | 8/2008 |
| JP | 2010126095 A | 6/2010 |
| JP | 2012115905 A | 6/2012 |

OTHER PUBLICATIONS

Extended European Search Report for EP 13 83 3604 dated Sep. 18, 2015.

* cited by examiner

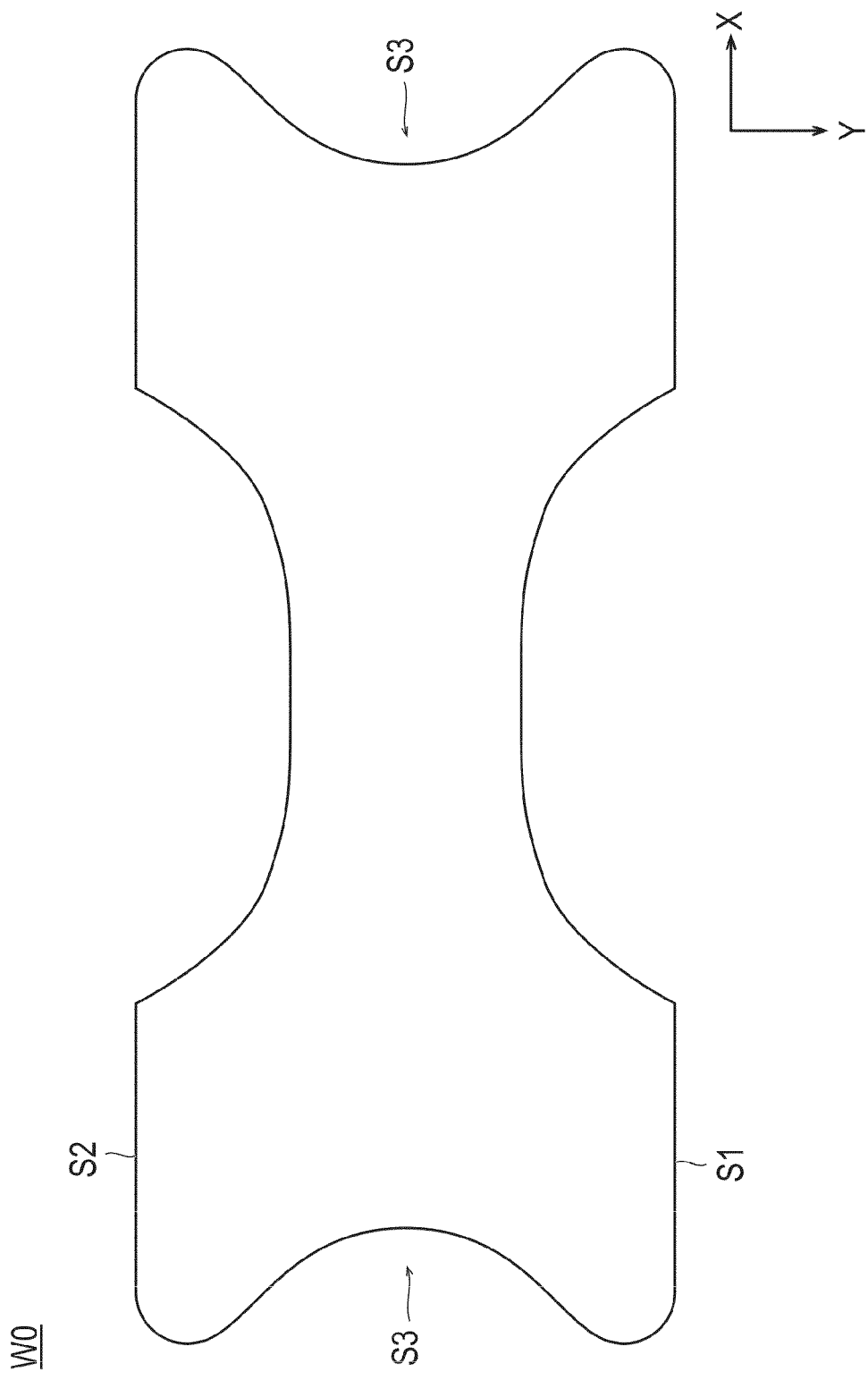

W6

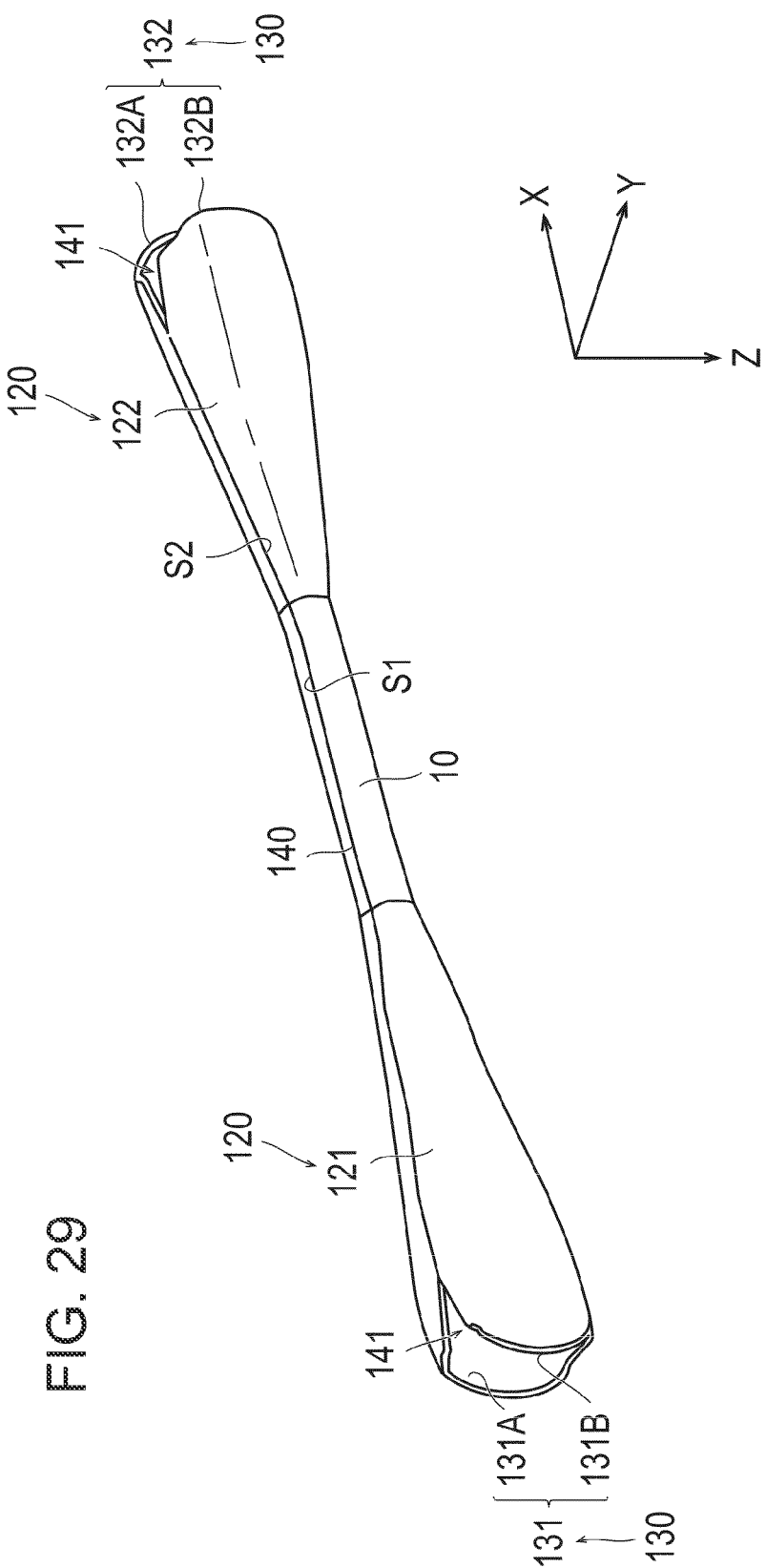

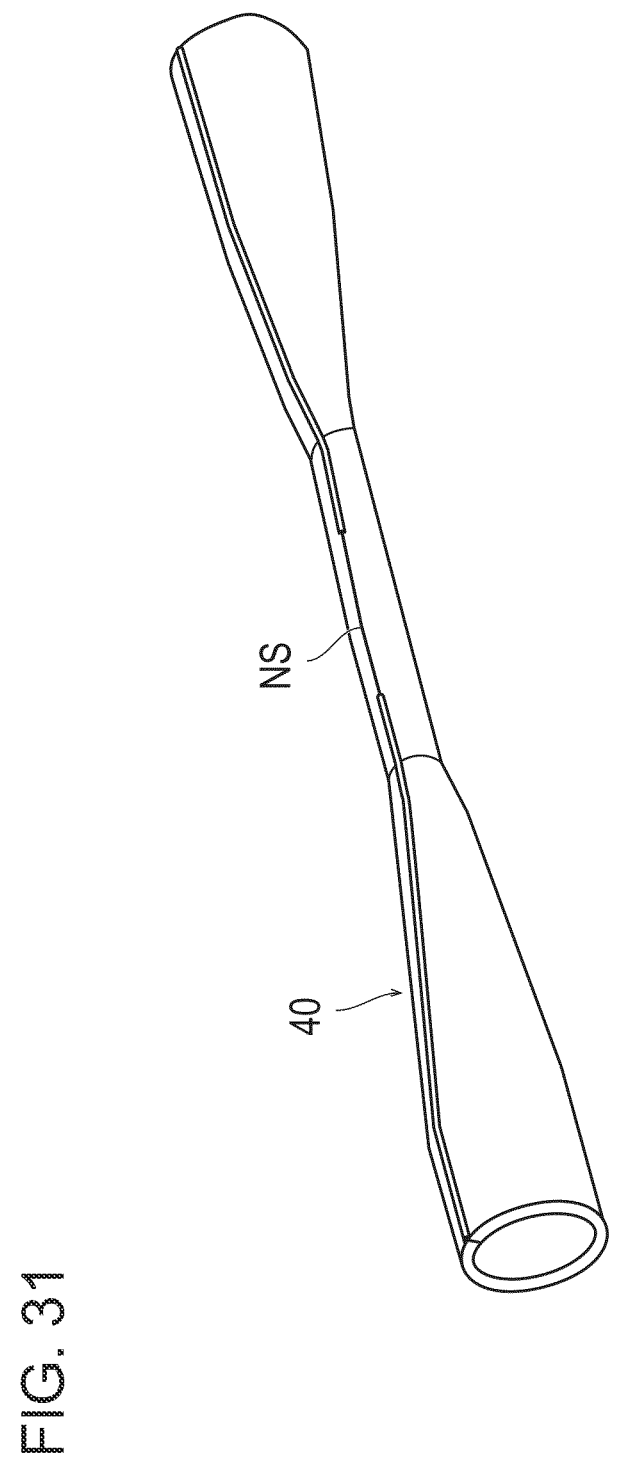

1

VEHICULAR ARM COMPONENT AND MANUFACTURING METHOD THE SAME

CROSS-REFERENCE TO RELATED APPLICATIONS

This application is a national stage application (under 35 U.S.C. §371) of PCT/JP2013/073400, filed Aug. 30, 2013, which claims benefit of Japanese Application No. PCT/JP2012/072253, filed Aug. 31, 2012, both of which are incorporated herein by reference in their entirety.

TECHNICAL FIELD

The present invention relates to a vehicular arm component and a manufacturing method thereof.

BACKGROUND ART

As a vehicular arm component, there is a suspension arm which connects a vehicle body and a wheel, and a radius rod which connects a subframe and the wheel. Such a vehicular arm component necessarily has a sufficient rigidity in order to endure a large force applied at the time when the vehicle runs or brakes while transferring a force.

As such as an arm component, for example, Patent Literature 1 discloses a suspension arm which includes a cylindrical pipe, a york portion bonded at one end in a longitudinal direction of the pipe by welding, and a bush attaching portion bonded to the other end by welding.

CITATION LIST

Patent Literatures

Patent Literature 1: JP-2002-98132 A, Paragraph [0002]

SUMMARY OF INVENTION

Technical Problem

However, in the suspension arm disclosed in Patent Literature 1, there is caused a steep change in the cross section between the pipe and the york portion bonded by welding and between the pipe and the bush attaching portion. Therefore, from the viewpoint of preventing damage caused by intensive stress, a welding work with high accuracy is required, so that a manufacturing cost is increased and a manufacturing process is complicated. Furthermore, from the same viewpoint, it is difficult to make reduction in weight for achieving a thin component.

The invention has been made to solve a problem caused by the related art, and an object thereof is to provide a vehicular arm component which has no steep change in the cross section and is easily manufactured and advantageous in cost.

Means for Solving Problem

The above object is achieved by the inventions described in the following (1) to (12).

(1) A vehicular arm component which is formed by subjecting a workpiece, the workpiece being a flat plate extending in a plane formed by a first direction and a second direction orthogonal to the first direction, to press processing in stages so as to butt and joint two side surfaces in the second direction, comprising: a cylindrical portion configured to be provided along the first direction and have a cylindrical shape; a bracket portion configured to be provided in either end in the first direction of the cylindrical portion and have an outer diameter expanding as it goes to the outside in the first direction; and two flange portions configured to be provided to face each other along the second direction in the bracket portion and provided with through holes at positions facing each other along the second direction, wherein the through hole is extended in a direction intersecting with the two side surfaces which are butted and jointed.

(2) The vehicular arm component according to (1), wherein the two side surfaces include, when viewed from a third direction orthogonal to the plane, a bonding portion configured to be butted and jointed, and a separation portion configured to be provided in either end of the first direction of the bonding portion and be separated while being expanded to the outside in the first direction.

(3) The vehicular arm component according to (1) or (2), wherein the cylindrical portion includes a vulnerable portion which is vulnerable in rigidity compared to the other portions of the cylindrical portion.

(4) The vehicular arm component according to (3), wherein the vulnerable portion is formed by a peripheral wall hole which is formed in a peripheral wall of the cylindrical portion.

(5) The vehicular arm component according to (4), wherein the peripheral wall hole is formed by butting and jointing notches which are formed in the two side surfaces each.

(6) The vehicular arm component according to (3), wherein a bonding portion where the two side surfaces are butted and jointed is subjected to welding except a non-welding portion, and wherein the vulnerable portion is formed by the non-welding portion.

(7) The vehicular arm component according to any one of (1) to (6), wherein an expanding rate α expressed by α=(d2−d1)/L is smaller than ⅓ (where, d1 is a diameter of an end portion of the cylindrical portion, d2 is a maximum diameter of the bracket portion, and L is a distance from the end portion of the cylindrical portion to a position of the maximum diameter of the bracket portion).

(8) A manufacturing method of a vehicular arm component which is manufactured in a hollow shape by subjecting a workpiece, the workpiece being a flat plate extending in a first plane formed by a first, direction and a second direction orthogonal to the first direction, to press processing in stages so as to butt and joint two side surfaces of the workpiece in a second plane formed by the first direction and a third direction orthogonal to the first plane, comprising: forming an extrusion portion which is extruded in the third direction and is extended while being expanded to the outside in the first direction in a third plane formed by the second direction and the third direction except a non-extrusion portion of the workpiece; making the two side surfaces abut on each other by subjecting the non-extrusion portion to the press processing along a bending shape of the extrusion portion in the third plane; forming a rectangular portion in either end in the first direction by performing the press processing in a state where cores are disposed in either end in the first direction; cutting parts of two side portions in the third direction of the rectangular portion; forming two flange portions along the second direction by subjecting the rectangular portion with cut parts of the two side portions to notch processing; and forming through holes at positions facing each other along the second direction of the two flange portions in a direction intersecting with the two side surfaces which are butted and jointed to each other by subjecting the rectangular portion with two flange portions formed to pierce processing.

(9) A manufacturing method of a vehicular arm component which is manufactured in a hollow shape by subjecting a workpiece, the workpiece being a flat plate extending in a first plane formed by a first direction and a second direction orthogonal to the first direction, to press processing in stages so as to butt and joint two side surfaces of the workpiece in a second plane formed by the first direction and a third direction orthogonal to the first plane, comprising: forming an extrusion portion by subjecting the workpiece to the press processing, the extrusion portion being extruded in the third direction in a third plane formed by the second direction and the third direction and being extended while being expanded to the outside in the first direction; forming a rectangular portion in either end in the first direction while making the two side surfaces abut on each other by subjecting the workpiece to the press processing in a state where a pair of cores is inserted to the workpiece from both sides in the first direction; and forming through holes by subjecting the rectangular portion to pierce processing at positions facing each other along the second direction of the rectangular portion.

(10) The manufacturing method of the vehicular arm component according to (8) or (9), further comprising: cutting a base plate, the base plate being a rectangular flat plate, to form the workpiece which is substantially parallel to the first direction in the vicinity of the center in the first direction, and substantially parallel to the first direction in the vicinity of either end while being expanded to the outside in the first direction when viewed from the third direction, before the forming of the extrusion portion, wherein the two side surfaces includes, when being butted and jointed to each other and viewed from the third direction, a bonding portion configured to be butted and jointed, and a separation portion configured to be provided in either end of the first direction of the bonding portion and be separated while being expanded to the outside in the first direction.

(11) The manufacturing method of the vehicular arm component according to any one of (8) to (10), further comprising: forming a vulnerable portion which is vulnerable in rigidity compared to the other portions after the abutting of the two side surfaces.

(12) The manufacturing method of the vehicular arm component according to (11), wherein after the two side surfaces abut on each other, an abutment portion on which the two side surfaces abut is subjected to welding except a non-welding portion, and the vulnerable portion is formed by the non-welding portion.

Advantageous Effect of the Invention

According to the invention described in (1), an outer diameter of a bracket portion is molded to be increased as it goes to the outside in a first direction by subjecting a workpiece (a flat plate) to press processing. Therefore, it is possible to provide a vehicular arm component which has no steep change in the cross section and is easily manufactured and advantageous in cost.

According to the invention described in (2), a separation portion is provided in either end in the first direction of a bonding portion to be butted and jointed, so that the vehicular arm component can be formed lighter. In addition, a yield of the material is improved.

According to the invention described in (3), a cylindrical portion has a vulnerable portion which is more vulnerable than the other portions. When a compressive load of a predetermined value or more is applied to the vehicular arm component, buckling can be made in the vulnerable portion.

According to the invention described in (4), a rigidity of the vulnerable portion can be appropriately set according to a size of a peripheral wall hole. The compressive load at which the vehicular arm component buckles can be freely set.

According to the invention described in (5), the peripheral wall hole is formed such that a notch previously formed is butted and jointed. There is no need to perform pierce processing, and the peripheral wall hole can be easily formed.

According to the invention described in (6), the pierce processing necessary for forming the vulnerable portion is not required, so that the vulnerable portion can be easily formed.

According to the invention described in (7), the outer diameter of the bracket portion is smoothly changed. It is possible to provide the vehicular arm component which has no steep change in the cross section.

According to the invention described in (8), the outer diameter of the bracket portion is formed large as it goes to the outside in the first direction by subjecting the workpiece (the flat plate) to the press processing. It is possible to provide the vehicular arm component which has no steep change in the cross section and is easily manufactured and advantageous in cost.

According to the invention described in (9), the outer diameter of the bracket portion is molded to be increased as it goes to the outside of the first direction by subjecting the workpiece (the flat plate) to the press processing. Therefore, it is possible to provide the vehicular arm component which has no steep change in the cross section and is easily manufactured and advantageous in cost. In addition, it is possible to manufacture the vehicular arm component through a less number of processes compared to the invention described in (8).

According to the invention described in (10), when two side surfaces abut on each other, the workpiece has a shape which is substantially parallel in the first direction in the vicinity of either end in the first direction, so that the two side surfaces do not come in point contact with a die in a pressing process. Therefore, it is possible to prevent partial friction of the die, and the die can be used for a long time. In addition, it is possible to obtain the workpiece from a base plate with efficiency, and a yield of the material is improved.

According to the invention described in (11), there is provided the vulnerable portion which is more vulnerable than the other portions. When a compressive load of a predetermined value or more is applied to the vehicular arm component, buckling can be made in the vulnerable portion.

According to the invention described in (12), the pierce processing necessary for forming the vulnerable portion is not required, so that the vulnerable portion can be easily formed.

BRIEF DESCRIPTION OF DRAWINGS

FIG. 1 is a diagram illustrating a suspension arm according to a first embodiment of the invention, in which

FIG. 3 is a diagram illustrating an extrusion process of a manufacturing method of the suspension arm according to the first embodiment, in which

FIG. 23A is a top view of the workpiece when the trimming process according to the second embodiment is completed.

FIG. 24 is a cross-sectional view taken along a plane orthogonal to the X axis, illustrating a bending process of the manufacturing method of the suspension arm according to the second embodiment, in which

FIG. 27 is a cross-sectional view taken along a plane orthogonal to the X axis near the center in the X direction, illustrating the abutting process of the manufacturing method of the suspension arm according to the second embodiment, in which

FIG. 28 is a cross-sectional view taken along a plane orthogonal to the X axis in the vicinity of either end in the X direction, illustrating the abutting process of the manufacturing method of the suspension arm according to the second embodiment, in which

FIG. 29 is a perspective view of the workpiece when the abutting process according to the second embodiment is completed.

FIG. 31 is a diagram illustrating another modified example of the suspension arm according to the embodiment.

DESCRIPTION OF EMBODIMENTS

<First Embodiment>

A first embodiment of the invention will be described with reference to the accompanying drawings. Further, in this embodiment, it is assumed that an arrangement surface of a flat plate is an XY plane in this embodiment, an extending direction of the flat plate is an X direction (a first direction), a direction orthogonal to the X direction in the arrangement surface is a Y direction (a second direction), and a direction orthogonal to the XY plane is a Z direction (a third direction).

As illustrated in FIG. 1, a vehicular arm component according to the embodiment is used in a vehicular suspension arm 1. The vehicular arm component is formed such that two side surfaces W1 and W2 in the Y direction are butted and jointed by subjecting a workpiece W (the flat plate) extending in the XY plane formed by the X direction and the Y direction to press processing in stages.

Figure 1A:
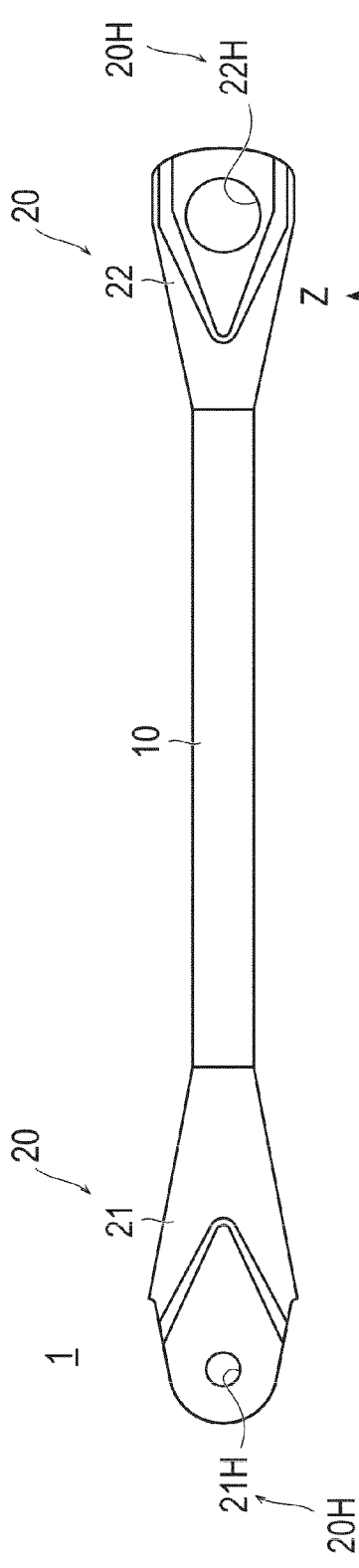
FIG. 1(A) illustrates a front view and FIG. 1(B) illustrates a top view.
Figure 1B:
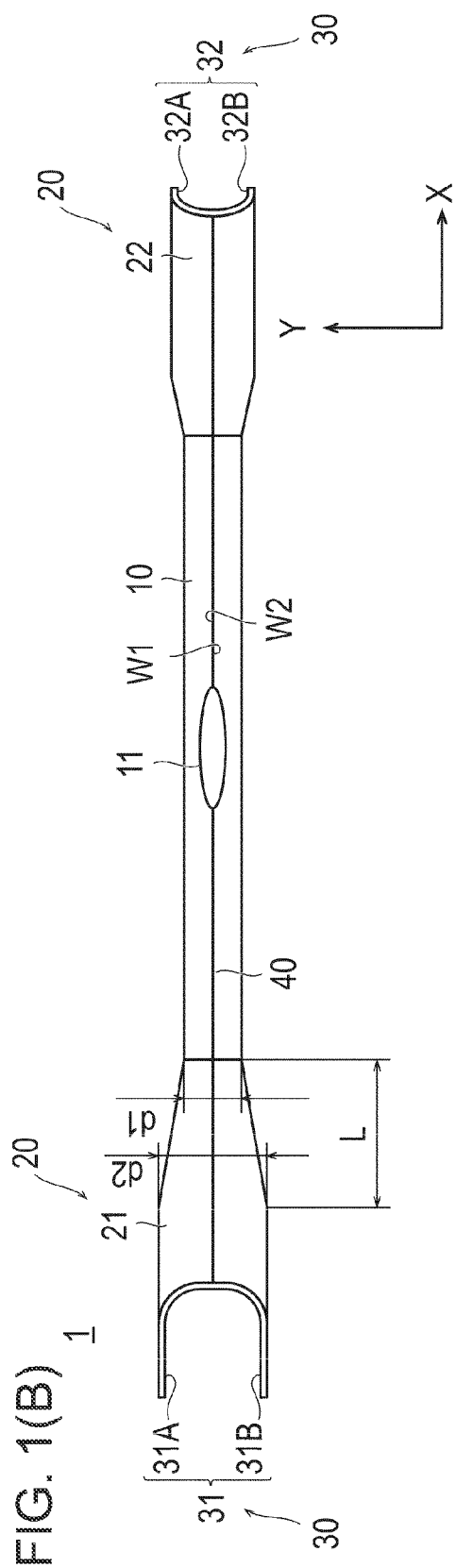

FIG. 1 is a diagram illustrating the suspension arm 1 according to the embodiment, in which FIG. 1(A) illustrates a front view and FIG. 1(B) illustrates a top view.

The suspension arm 1 includes a cylindrical portion 10 which is provided along the X direction and has a cylindrical shape, a bracket portion 20 which is provided on either end in the X direction of the cylindrical portion 10 and has an outer diameter expanding as it goes to the outside in the X direction, and two flange portions 30 which are provided in the bracket portion 20 to face each other along the Y direction and include through holes 20H at positions facing each other along the Y direction.

The cylindrical portion 10 includes a vulnerable portion 11 which is vulnerable in rigidity compared to the other portions of the cylindrical portion 10. The vulnerable portion 11 is formed by a peripheral wall hole which is formed in the peripheral wall of the cylindrical portion 10. With the configuration of the vulnerable portion 11, when a compressive load of a predetermined value or more is added to the suspension arm 1, buckling can be made in the vulnerable portion 11.

The bracket portion 20 includes a first bracket portion 21 provided in the left end of the cylindrical portion 10 and a second bracket portion 22 provided in the right end of the cylindrical portion 10.

The bracket portion 20 is configured to have an outer diameter expanding as it goes to the outside in the X direction which will be described below in detail. In other words, when it is assumed that a diameter of an end portion of the cylindrical portion 10 is d1, a maximum diameter of the bracket portion 20 is d2, and a distance from the end portion of the cylindrical portion 10 to a position corresponding to the maximum diameter of the bracket portion 20 is L, an expanding rate α (expressed by α=(d2−d1)/L) becomes smaller than ⅓. Therefore, since the outer diameter of the bracket portion 20 is smoothly changed, there is no steep change in the cross section and thus stress concentration is suppressed.

The flange portion 30 includes a first flange portion 31 provided in the left end of the first bracket portion 21 and a second flange portion 32 provided in the right end of the second bracket portion 22.

The first flange portion 31 includes two plates 31A and 31B which are provided along the Y direction to face each other and are provided with first through holes 21H at positions facing each other along the Y direction.

The second flange portion 32 includes two the plates 32A and 32B which are provided along the Y direction to face each other and are provided with second through holes 22H at positions facing each other along the Y direction.

A hole diameter of the first through hole 21H is formed to be smaller than that of the second through hole 22H, and the first through hole 21H and the second through hole 22H form the through hole 20H.

The first through hole 21H is connected to a wheel (not illustrated) by a bolt (not illustrated) inserted from a side near the wheel to an inner portion and a nut (not illustrated).

The second through hole 22H includes a bush pressed-fit thereto and is connected to a shaft member (not illustrated) which is pressed fit thereto and protrudes from a vehicle body with an elastic member such as a rubber interposed therebetween.

The suspension arm 1 further includes a bonding portion 40 to which the two side surfaces W1 and W2 are butted and jointed. As illustrated in FIG. 1(B), the bonding portion 40 is bonded by welding in the X direction except the vulnerable portion 11.

Next, a manufacturing method of the suspension arm 1 according to the embodiment will be described.

Figure 2:
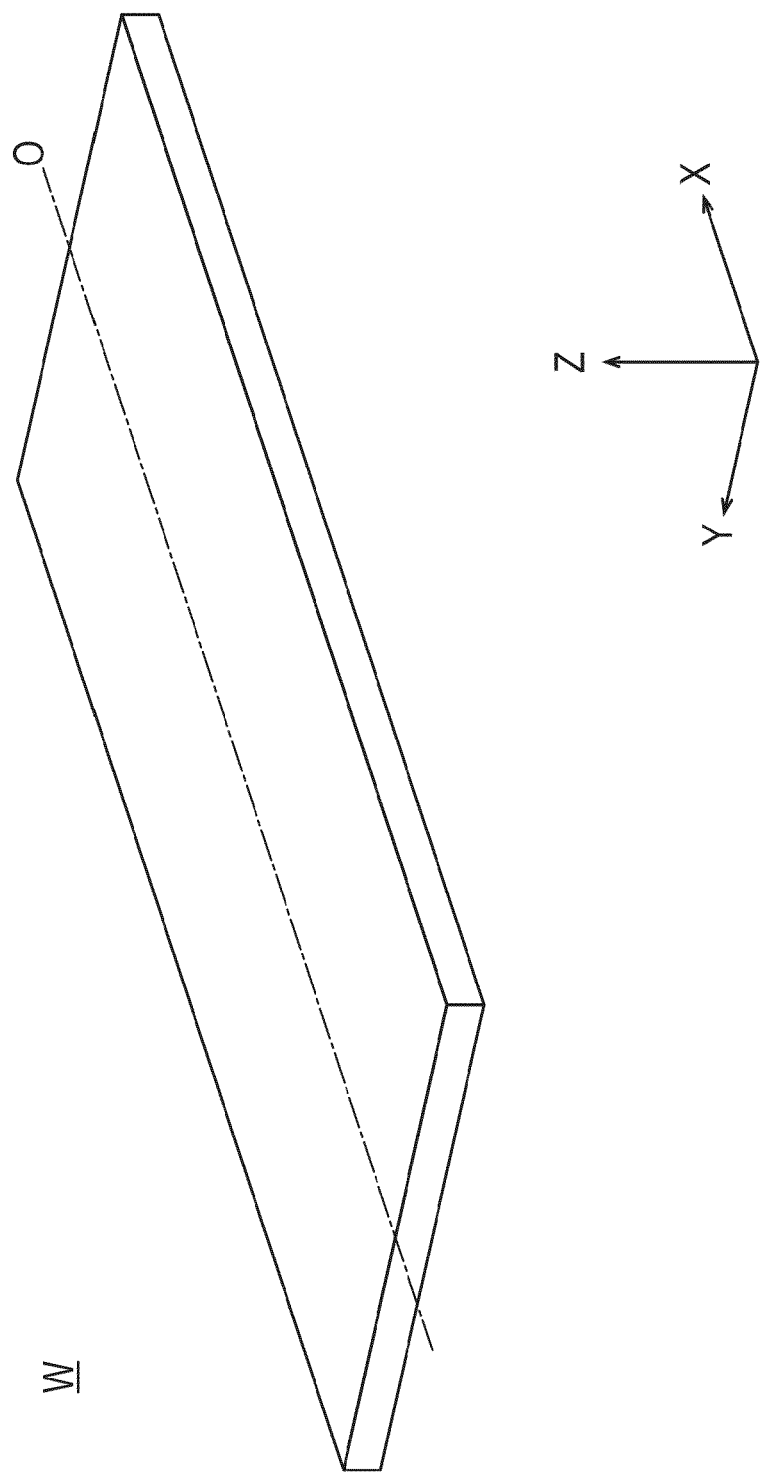
FIG. 2 is a perspective view illustrating a workpiece (a flat plate) before press processing of the suspension arm according to the first embodiment.

FIG. 2 is a diagram illustrating the workpiece W (a metal flat plate) before the press processing of the suspension arm 1 according to the embodiment.

First, in a YZ plane, an extrusion portion P is formed such that the workpiece is extruded in the Z direction through a bending portion K and extended while being expanded to the outside in the X direction except a non-extrusion portion NP of the workpiece W (an extrusion process).

Figure 3A:
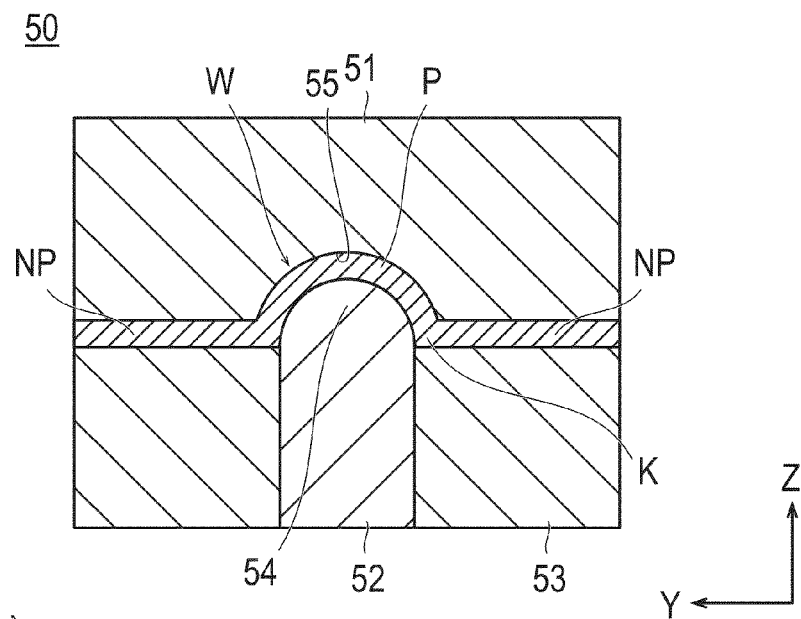
FIG. 3(A) is a cross-sectional view taken along a plane orthogonal to an X axis and FIG. 3(B) is a cross-sectional view illustrating a center portion taken along a center line orthogonal to a Y axis.
Figure 3B:
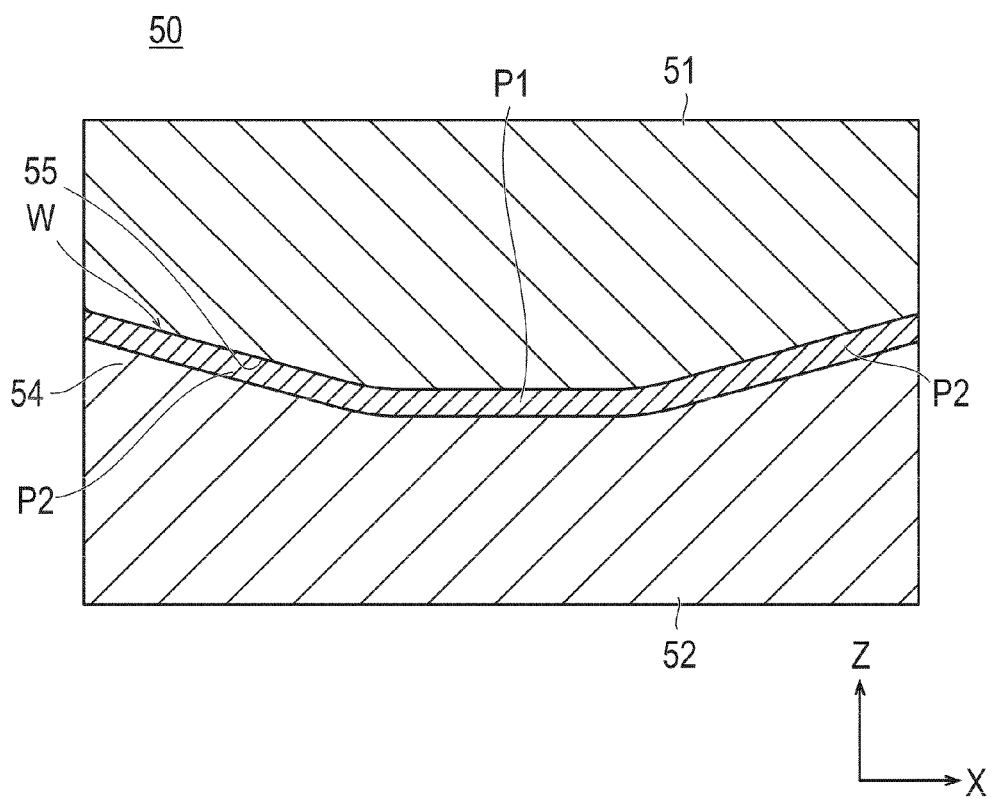
Figure 4:
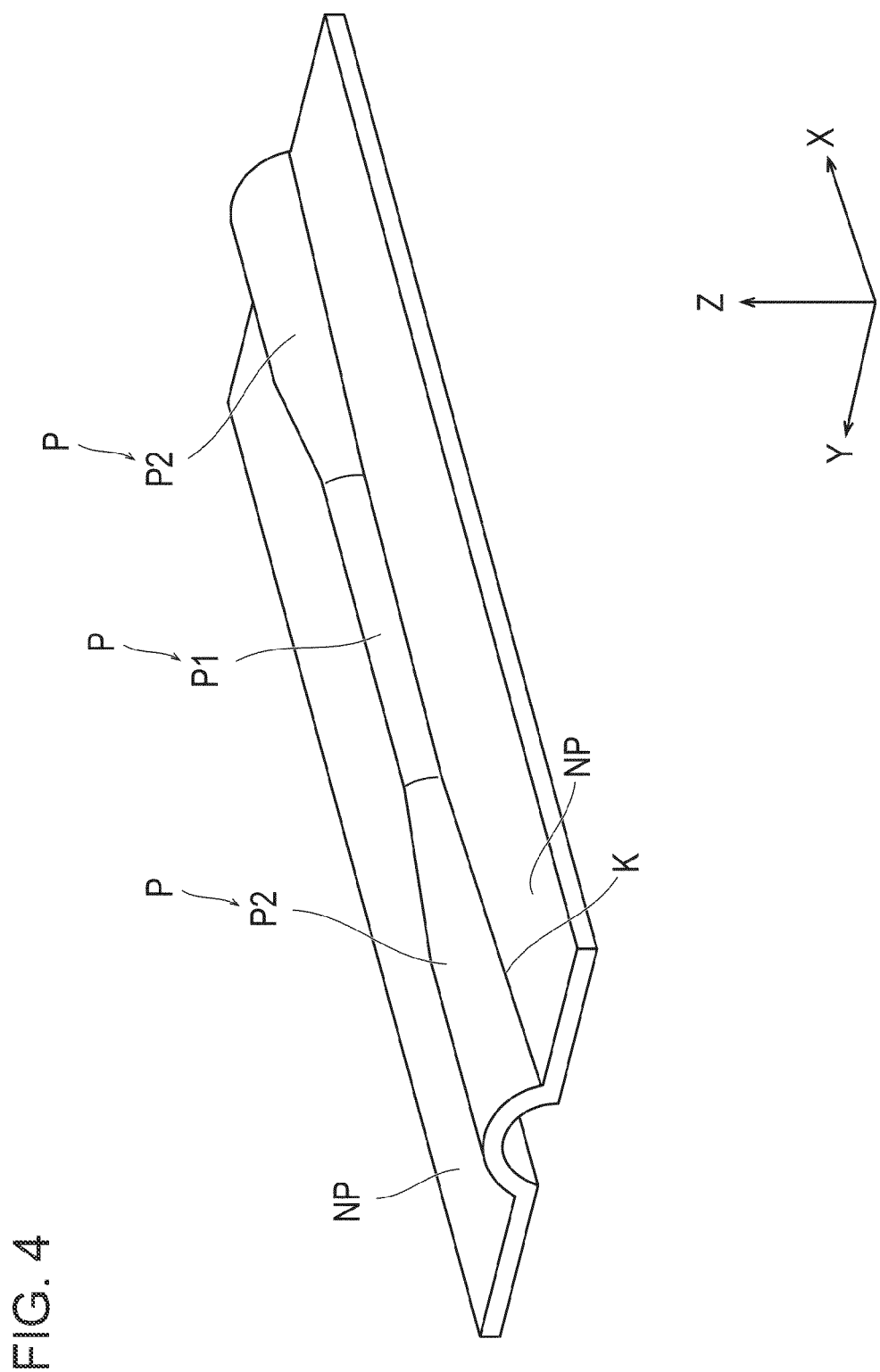
FIG. 4 is a perspective view of the workpiece when the extrusion process according to the first embodiment is completed.

FIG. 3 is a diagram illustrating the extrusion process of the manufacturing method of the suspension arm 1 according to the embodiment, in which FIG. 3(A) is across-sectional view taken along a plane orthogonal to an X axis and FIG. 3(B) is a cross-sectional view of a center portion taken along a center line O of FIG. 2 orthogonal to a Y axis. FIG. 4 is a perspective view of the workpiece W when the extrusion process is completed.

As illustrated in FIG. 3(A), the workpiece W (the flat plate) is extruded upward in the Z direction by a first forming die 50, so that the extrusion portion P is formed. The first forming die 50 includes a first upper die 51, a first lower die 52 which is provided to face the first upper die 51, and a blank holder 53. In the first lower die 52, a convex portion 54 is formed to be extended in the X direction while protruding toward the first upper die 51. In the first upper die 51, a groove portion 55 is formed to be dented in correspondence with the convex portion 54 of the first lower die 52. The blank holder 53 is provided in the outer peripheral of the first lower die 52.

In the extrusion process, first, the workpiece W is placed in the first forming die 50, the first upper die 51 and the blank holder 53 are approached to each other in a state where the first lower die 52 is separated from the first upper die 51, and the workpiece W is interposed by the first upper die 51 and the blank holder 53.

Thereafter, the first lower die 52 is approached to the first upper die 51, and then the extrusion portion P is formed in the workpiece W to protrude in a direction heading toward the first upper die 51 corresponding to the groove portion 55 of the first upper die 51. The extrusion portion P includes a first extrusion portion P1 which is formed in the vicinity of the center in the X direction and has the same shape in the X direction and a second extrusion portion P2 which is formed in either end of the first extrusion portion P1 in the X direction and expanded to the outside in the X direction.

In the extrusion process, since the workpiece W is interposed by the first upper die 51 and the blank holder 53, a deviation of an inflow of the workpiece W can be suppressed and a defect such as wrinkles can be prevented.

In this way, through the extrusion process, as illustrated in FIG. 4, the extrusion portion P is formed such that the workpiece is extruded in the Z direction through the bending portion K and extended while being expanded to the outside in the X direction except the non-extrusion portion NP of the workpiece W.

Next, unnecessary portions in the outer peripheral of the non-extrusion portion NP of the workpiece W are trimmed (a trimming process).

Figure 5:
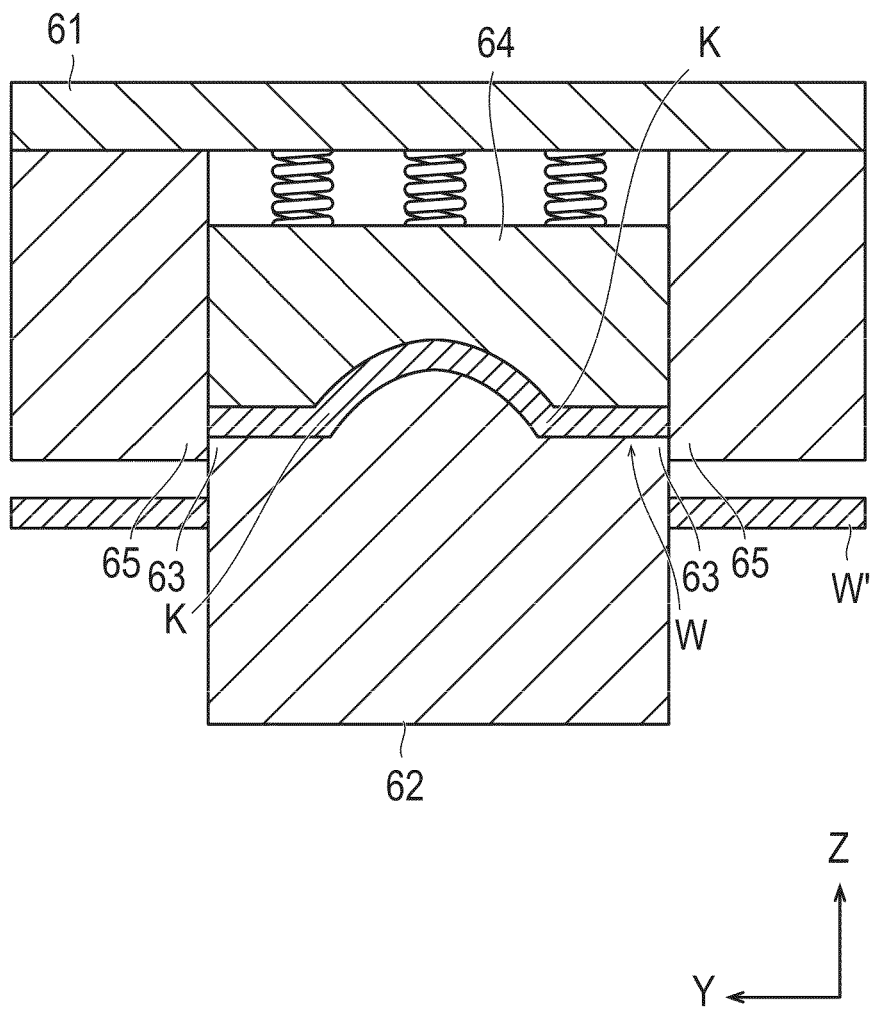
FIG. 5 is a cross-sectional view taken along a plane orthogonal to the X axis, illustrating a trimming process of the manufacturing method of the suspension arm according to the first embodiment.
Figure 6:
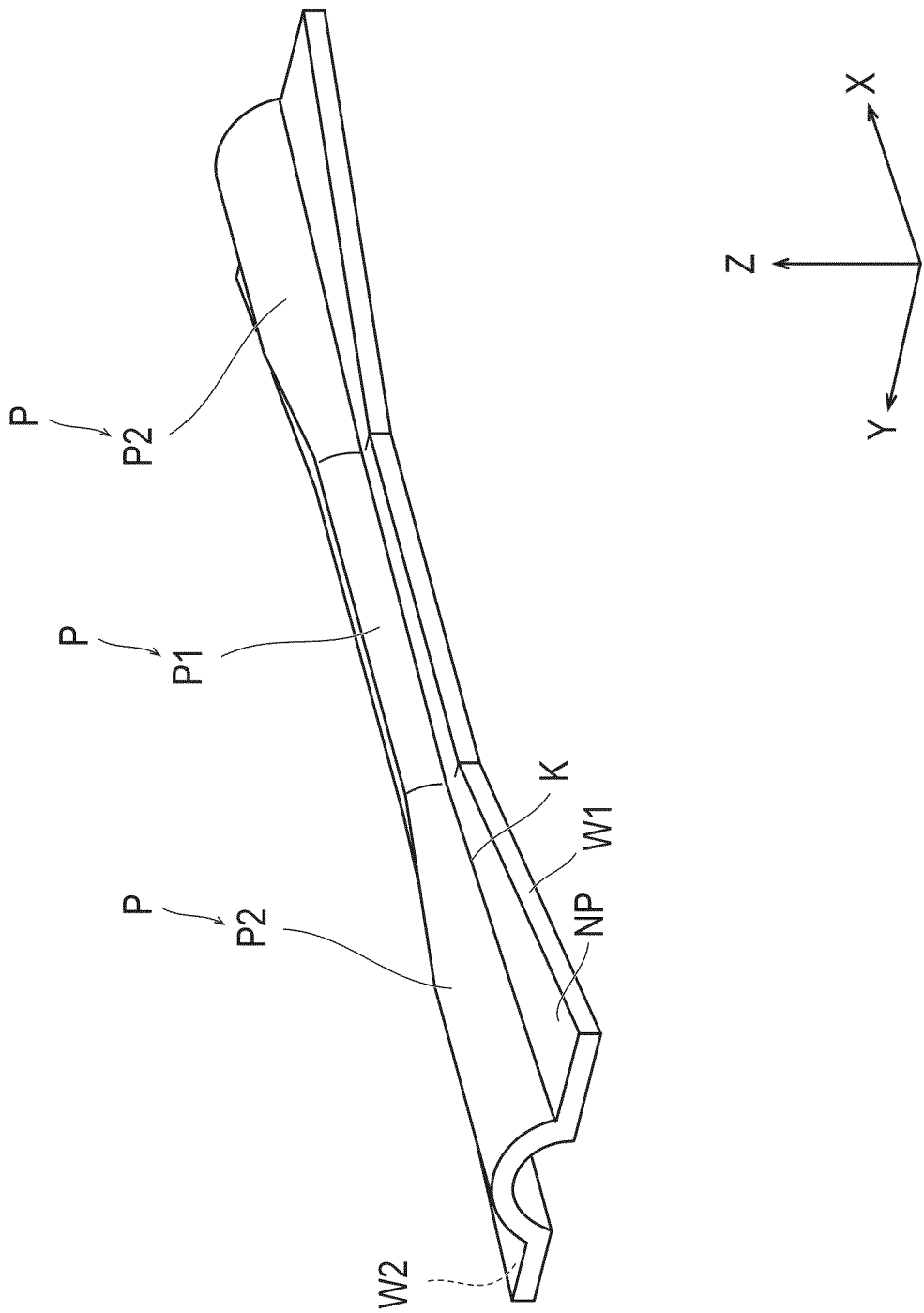
FIG. 6 is a perspective view of the workpiece when the trimming process according to the first embodiment is completed.

FIG. 5 is a cross-sectional view taken along a plane orthogonal to the X axis, illustrating the trimming process of the manufacturing method of the suspension arm 1 according to the embodiment. FIG. 6 is a perspective view of the workpiece W when the trimming process is completed.

As illustrated in FIG. 5, the workpiece W having the extrusion portion P formed therein is trimmed by a second forming die 60. The second forming die 60 includes a second upper die 61 and a second lower die 62. In the second lower die 62, a lower-die cutting blade 63 is formed at the outer peripheral end of the surface facing the second upper die 61. In the second upper die 61, a holder portion 64 is provided to face the second lower die 62 and provided with springs in the rear surface to be urged in a direction toward the second lower die 62. Further, an upper-die cutting blade 65 is provided in the outer peripheral of the holder portion 64 to pair up with the lower-die cutting blade 63. The second lower die 62 and the holder portion 64 are formed in a shape corresponding to a desired shape of the workpiece W.

In the trimming process, first, the workpiece W having the extrusion portion P formed therein is placed in the second forming die 60, and the second upper die 61 and the second lower die 62 are approached. When the workpiece W is interposed between the holder portion 64 of the second upper die 61 and the second lower die, the holder portion 64 is retracted while being urged by the springs. When the holder portion 64 is retracted, the workpiece W is interposed between the upper-die cutting blade 65 and the lower-die cutting blade 63, and as illustrated in FIG. 5, an outer peripheral portion W' of the workpiece W is cut down. Thereafter, when the second upper die 61 and the second lower die 62 are separated, the workpiece W is taken out of the second upper die 61 by a repulsive force of the springs.

In this way, through the trimming process, as illustrated in FIG. 6, the unnecessary portions of the non-extrusion portion NP of the workpiece W are trimmed, and the two side surfaces W1 and W2 are formed along the Y direction.

Next, the trimmed workpiece W is bent (a bending process).

Figure 7:
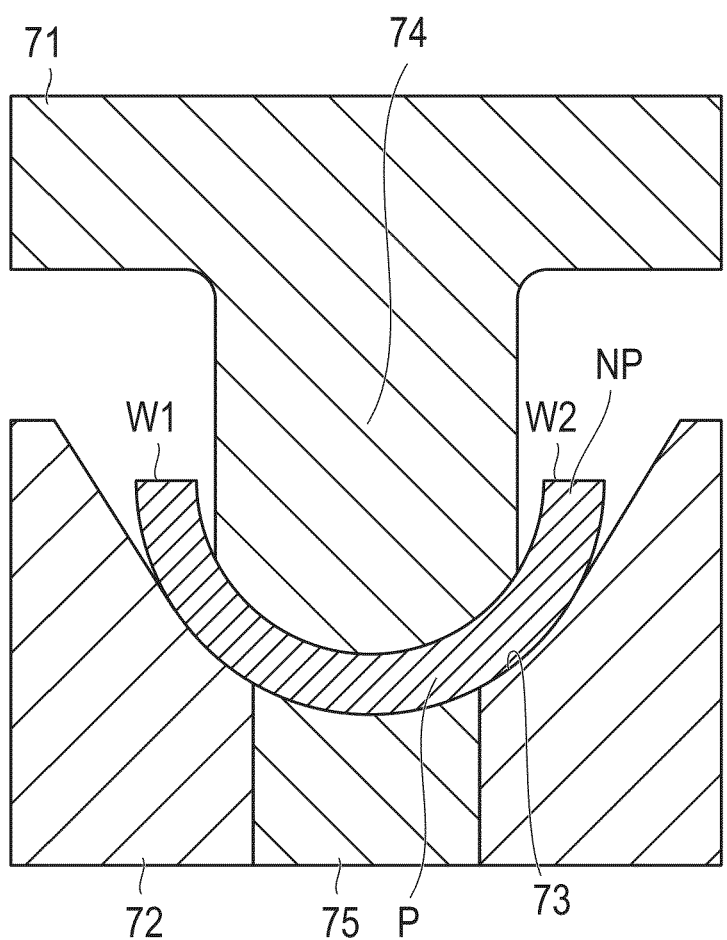
FIG. 7 is a cross-sectional view taken along a plane orthogonal to the X axis, illustrating a bending process of the manufacturing method of the suspension arm according to the first embodiment.
Figure 8:
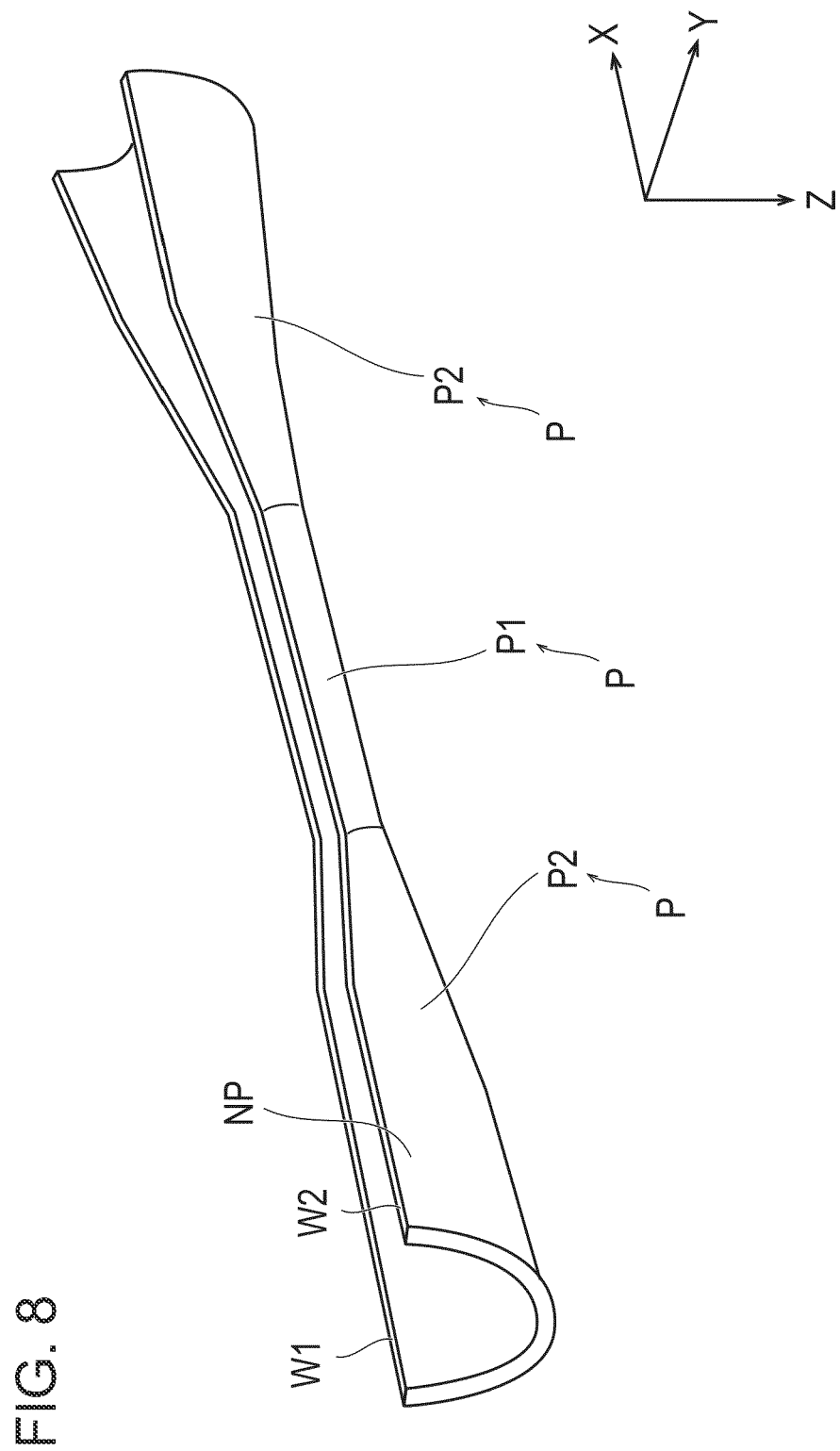
FIG. 8 is a perspective view of the workpiece when the bending process according to the first embodiment is completed.

FIG. 7 is a cross-sectional view taken along a plane orthogonal to the X axis, illustrating the bending process of the manufacturing method of the suspension arm 1 according to the embodiment. FIG. 8 is a perspective view of the workpiece W when the bending process is completed.

As illustrated in FIG. 7, the trimmed workpiece W is vertically reversed and bent by a third forming die 70. The third forming die 70 includes a third lower die 72 in which a groove portion 73 fitted to the workpiece W is formed, and a third upper die 71 in which a convex portion 74 fitted to the groove portion 73 is formed. In addition, in the third lower die 72, a projecting portion 75 is provided to protrude the molded workpiece W from the groove portion 73.

In the bending process, first, the trimmed workpiece W is vertically reversed and placed in the third forming die 70, and the third upper die 71 and the third lower die 72 are approached. When the workpiece W is interposed between the convex portion 74 of the third upper die 71 and the groove portion 73 of the third lower die 72, the bending portion K between the extrusion portion P and the non-extrusion portion NP is pressed, and a cross direction of the two side surfaces W1 and W2 becomes a direction (upward in the Z direction) toward the third upper die 71. Then, the workpiece W molded by the third forming die 70 is made to protrude from the groove portion 73 by the projecting portion 75.

In this way, through the bending process, as illustrated in FIG. 8, the cross direction of the two side surfaces W1 and W2 is bent upward in the Z direction.

Next, the workpiece W bent through the bending process is bent additionally, and the two side surfaces W1 and W2 are approached (an inner bending process).

Figure 9:
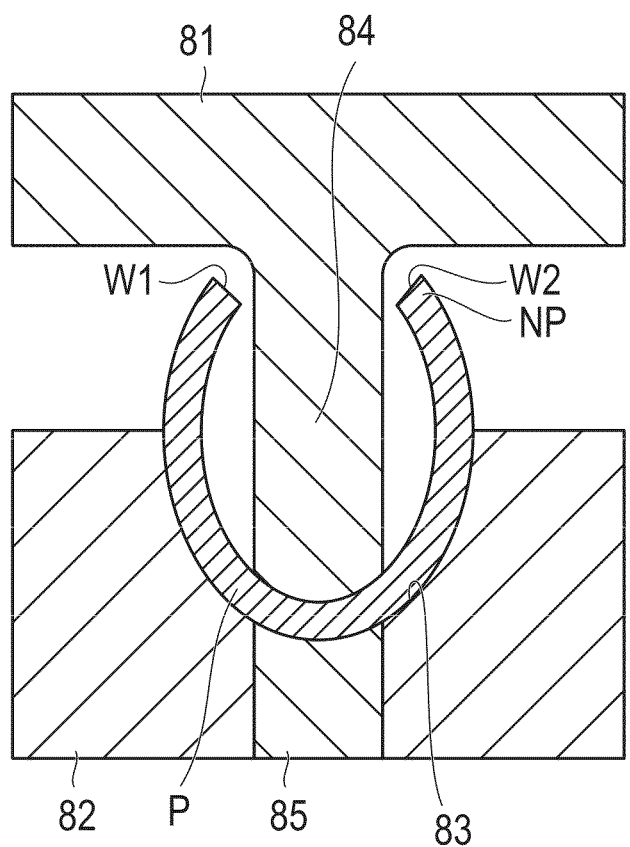
FIG. 9 is a cross-sectional view taken along a plane orthogonal to the X axis, illustrating an inner bending process of the manufacturing method of the suspension arm according to the first embodiment.
Figure 10:
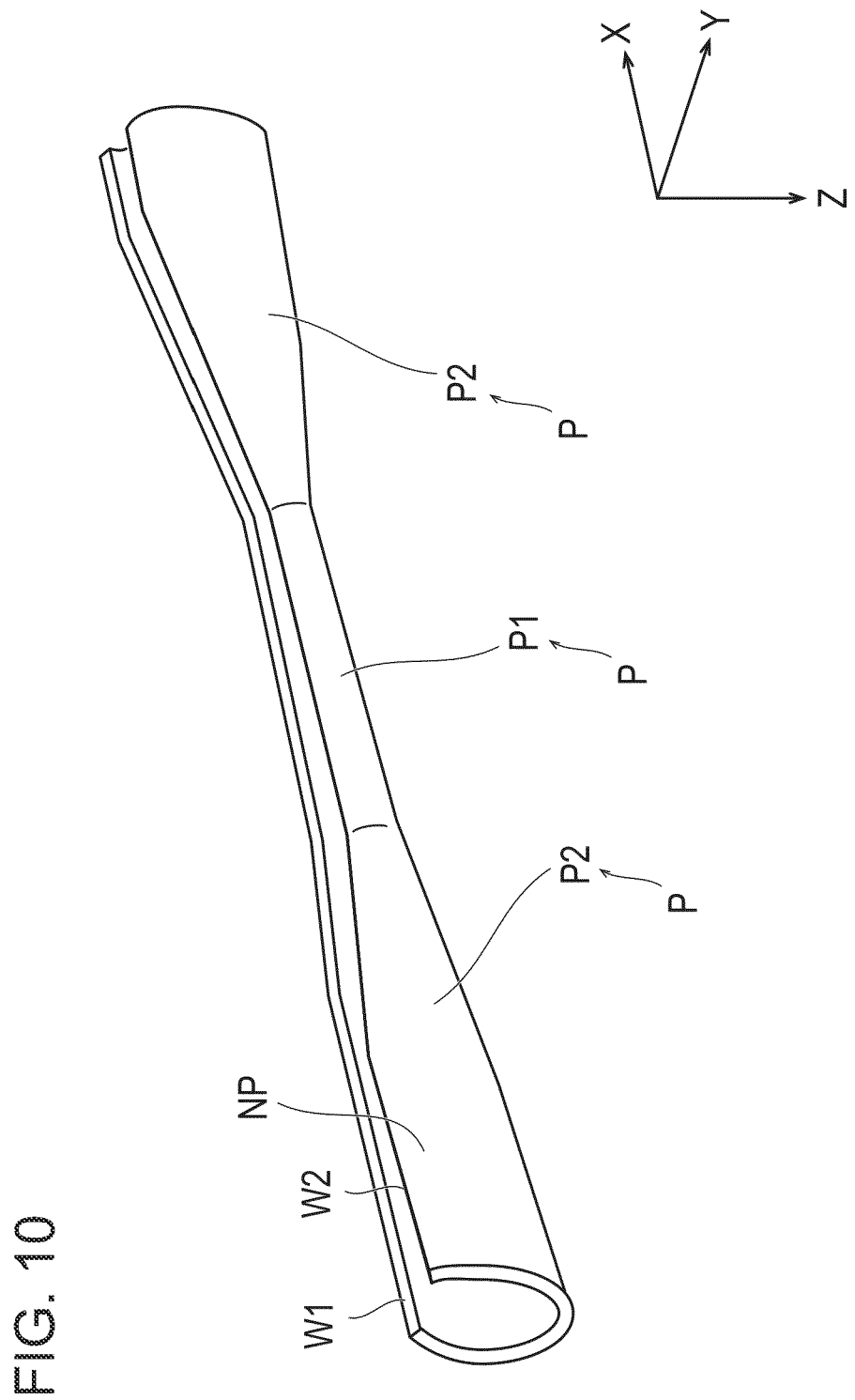
FIG. 10 is a perspective view of the workpiece when the inner bending process according to the first embodiment is completed.

FIG. 9 is a cross-sectional view taken along a plane orthogonal to the X axis, illustrating the inner bending process of the manufacturing method of the suspension arm 1 according to the embodiment. FIG. 10 is a perspective view of the workpiece W when the inner bending process is completed.

As illustrated in FIG. 9, the workpiece W bent through the bending process is bent additionally by a fourth forming die 80. The fourth forming die 80 includes a fourth lower die 82 in which a groove portion 83 fitted to the workpiece W is formed, and a fourth upper die 81 in which a convex portion 84 fitted to the groove portion 83 is formed. In addition, in the fourth lower die 82, a projecting portion 85 is provided to protrude the molded workpiece W from the groove portion 83.

In the inner bending process, first, the workpiece W is placed in the fourth forming die 80, and the fourth upper die 81 and the fourth lower die 82 are approached. The convex portion 84 of the fourth forming die 80 is formed to be longer than the convex portion 74 of the third forming die 70 in a pressing direction, and has a narrow width compared to the convex portion 74. Further, the groove portion 83 of the fourth forming die 80 is also formed to be longer than the groove portion 73 of the third forming die 70 in the pressing direction in correspondence with the convex portion 84, and has a narrow width compared to the groove portion 73. Therefore, the molded workpiece W is molded to become longer in an extruding direction, and the two side surfaces W1 and W2 are approached. The workpiece W molded by the fourth forming die 80 is made to protrude from the groove portion 83 by the projecting portion 85.

In this way, through the inner bending process, as illustrated in FIG. 10, the two side surfaces W1 and W2 are approached.

Next, the workpiece W bent through the inner bending process is bent additionally, and the two side surfaces W1 and W2 are made to abut on each other (an abutting process).

Figure 11:
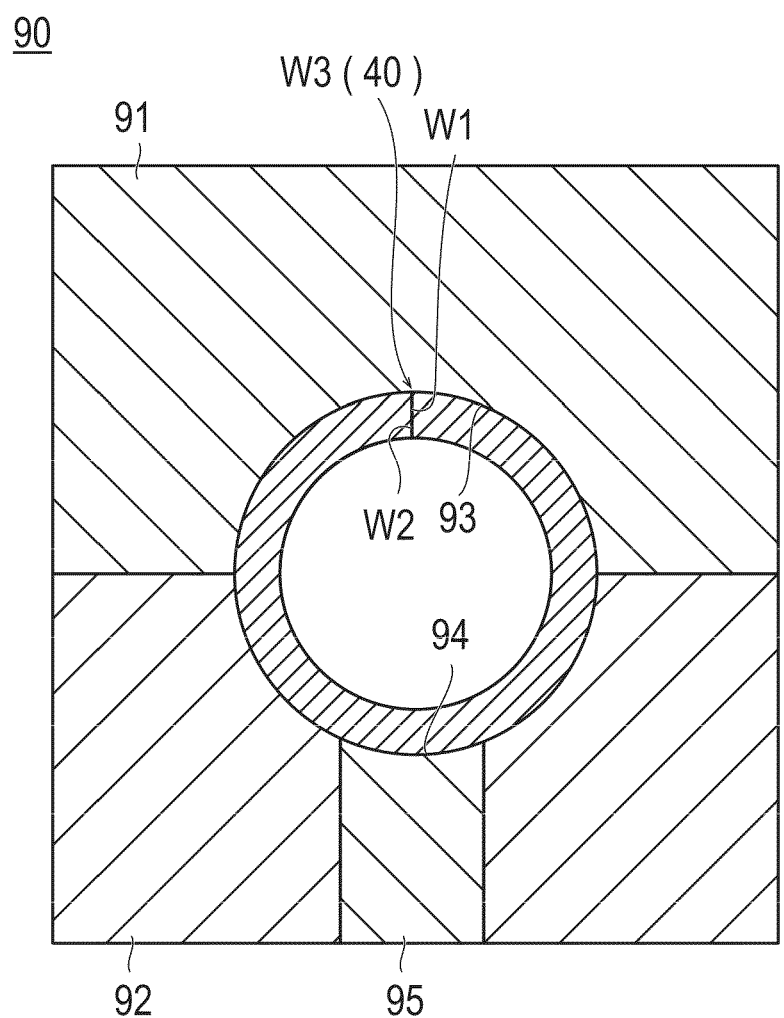
FIG. 11 is a cross-sectional view taken along a plane orthogonal to the X axis, illustrating an abutting process of the manufacturing method of the suspension arm according to the first embodiment.
Figure 12:
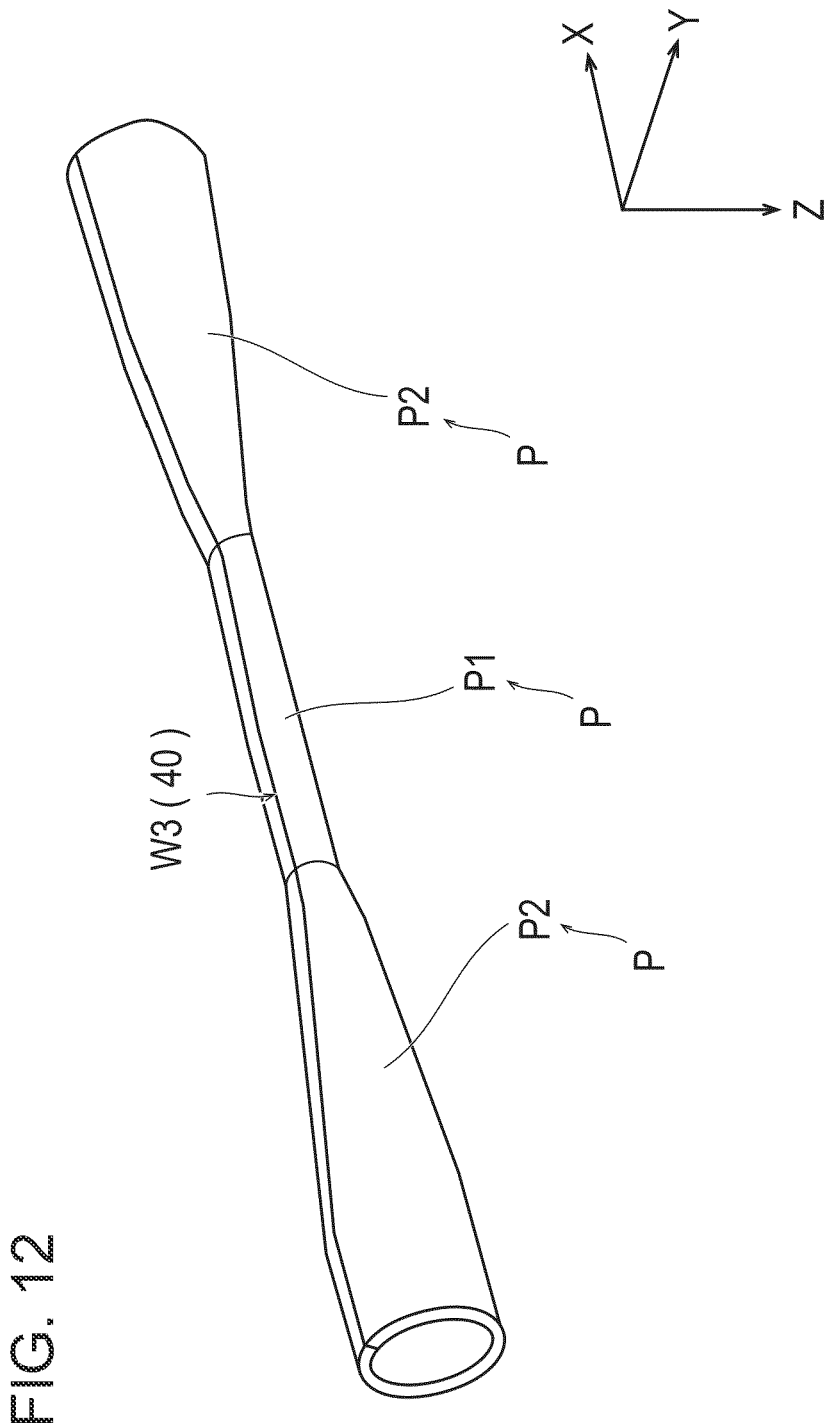
FIG. 12 is a perspective view of the workpiece when the abutting process according to the first embodiment is completed.

FIG. 11 is a cross-sectional view taken along a plane orthogonal to the X axis, illustrating the abutting process of the manufacturing method of the suspension arm 1 according to the embodiment. FIG. 12 is a perspective view of the workpiece W when the abutting process is completed.

As illustrated in FIG. 11, the workpiece W bent through the inner bending process is bent additionally by a fifth forming die 90. The fifth forming die 90 includes a fifth upper die 91 in which an upper-die groove portion 93 fitted to the workpiece W is formed, and a fifth lower die 92 which faces the fifth upper die 91 and is provided with a lower-die groove portion 94 fitted to the workpiece W. In addition, in the fifth lower die 92, a projecting portion 95 is provided to protrude the molded workpiece W from the lower-die groove portion 94.

In the abutting process, first, the workpiece W is placed in the fifth forming die 90 such that the portions of the two side surfaces W1 and W2 face to the fifth upper die 91, and the fifth upper die 91 and the fifth lower die 92 are approached. Since the workpiece W is made long in the extruding direction between the upper-die groove portion 93 and the lower-die groove portion 94, the two side surfaces W1 and W2 abut on each other moving along the wall surface of the upper-die groove portion 93 by making the fifth upper die 91 and the fifth lower die 92 approach. Furthermore, an abutment portion W3 on which the two side surfaces W1 and W2 abut are bonded by welding, and thus the bonding portion 40 is formed.

In this way, through the abutting process, as illustrated in FIG. 12, the two side surfaces W1 and W2 abut on each other.

Next, a rectangular portion W4 is formed in either end in the X direction of the workpiece W of which the two side surfaces W1 and W2 abut on each other (a rectangular shape forming process).

Figure 13:
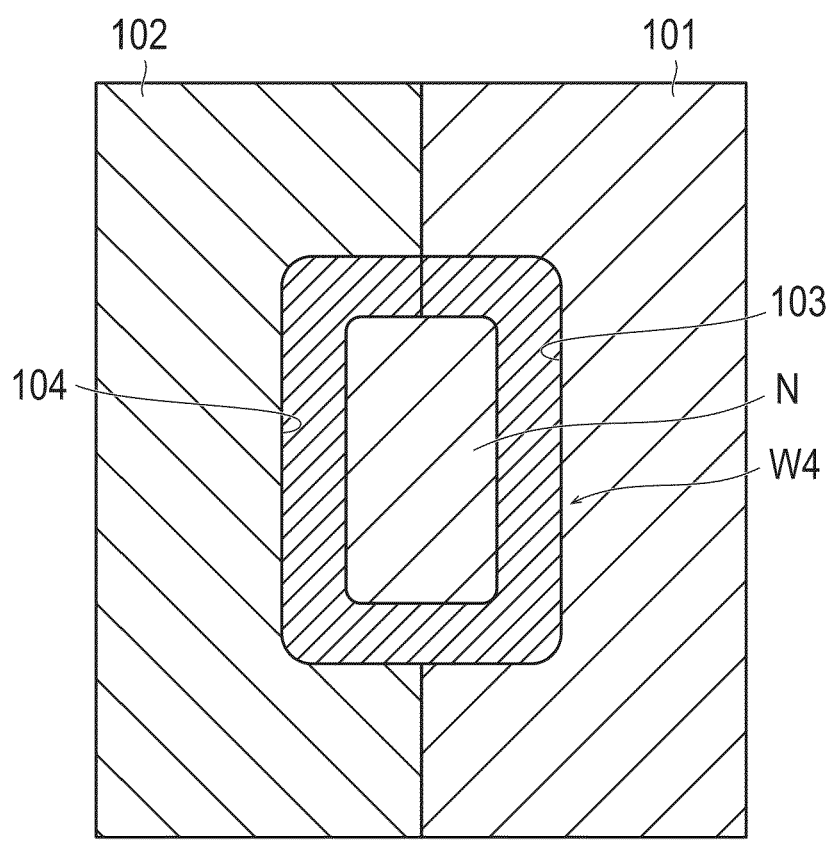
FIG. 13 is a cross-sectional view taken along a plane orthogonal to the X axis on either end in an X direction, illustrating a rectangular shape forming process of the manufacturing method of the suspension arm according to the first embodiment.
Figure 14:
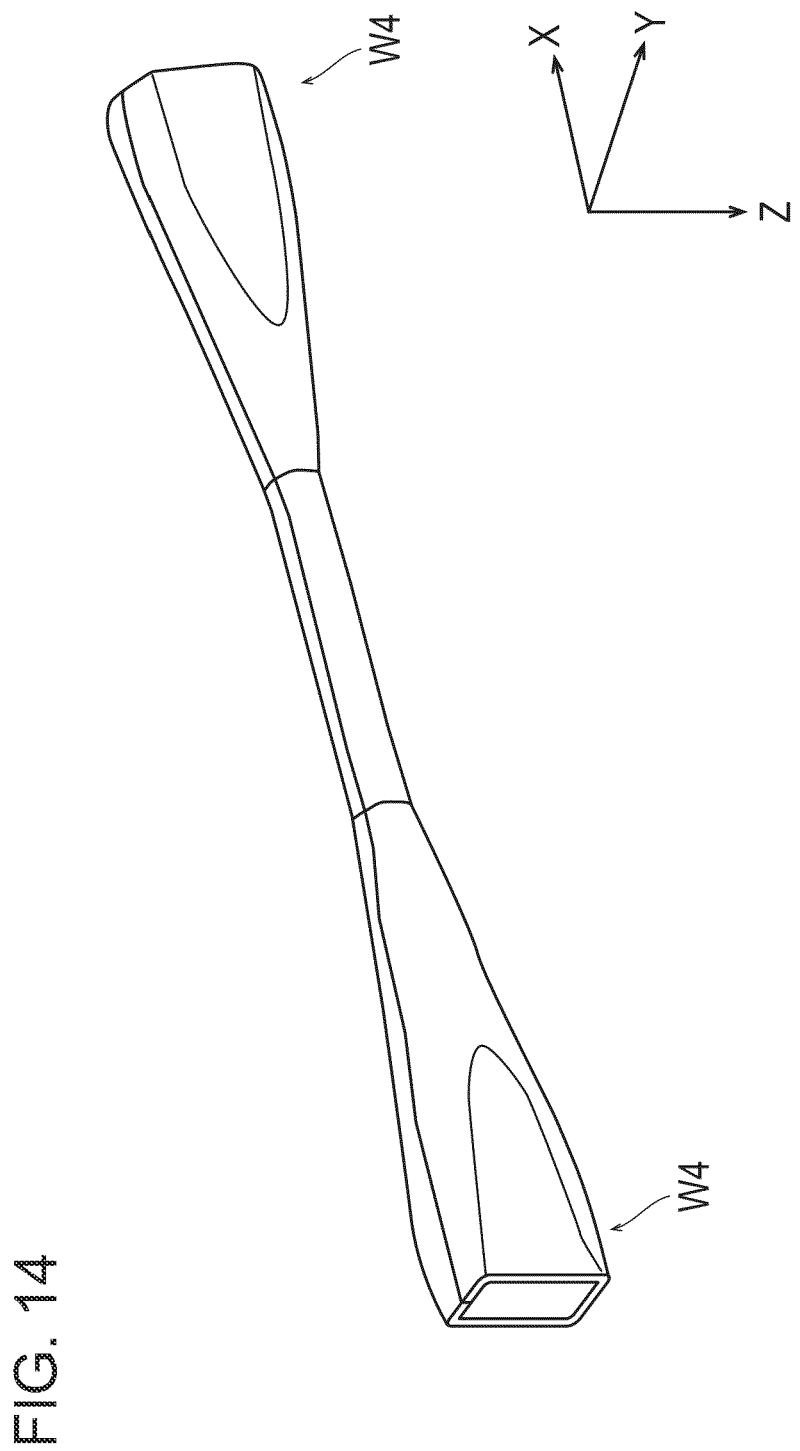
FIG. 14 is a perspective view of the workpiece when the rectangular shape forming process according to the first embodiment is completed.

FIG. 13 is a cross-sectional view taken along a plane orthogonal to the X axis on either end in the X direction, illustrating the rectangular shape forming process of the suspension arm 1 according to the embodiment. FIG. 14 is a perspective view of the workpiece W when the rectangular shape forming process is completed.

As illustrated in FIG. 13, a core N having a rectangular shape in cross section is disposed in either end in the X direction of the workpiece W of which the two side surfaces W1 and W2 abut on each other, and then the rectangular portion W4 is formed by a sixth forming die 100. The sixth forming die 100 includes a sixth right die 101 in which a right-die groove portion 103 fitted to the workpiece W is formed, and a sixth left die 102 which faces the sixth right die 101 and is provided with a left-die groove portion 104 fitted to the workpiece W.

In the rectangular shape forming process, first, the core N is disposed in either end in the X direction of the workpiece W, and then the sixth right die 101 and the sixth left die 102 are approached. While the sixth right die 101 and the sixth left die 102 are approached, either end in the X direction of the workpiece W is pressed in the rectangular shape along the external form of the core N and the right-die groove portion 103 and the left-die groove portion 104, and the rectangular portion W4 is formed.

In this way, through the rectangular shape forming process, as illustrated in FIG. 14, the rectangular portion W4 is formed in either end in the X direction of the workpiece W.

Next, parts F1 and F2 of two side portions in the Z direction of the rectangular portion W4 formed on either end in the X direction through the rectangular shape forming process are cut (a cutting process).

Figure 15:
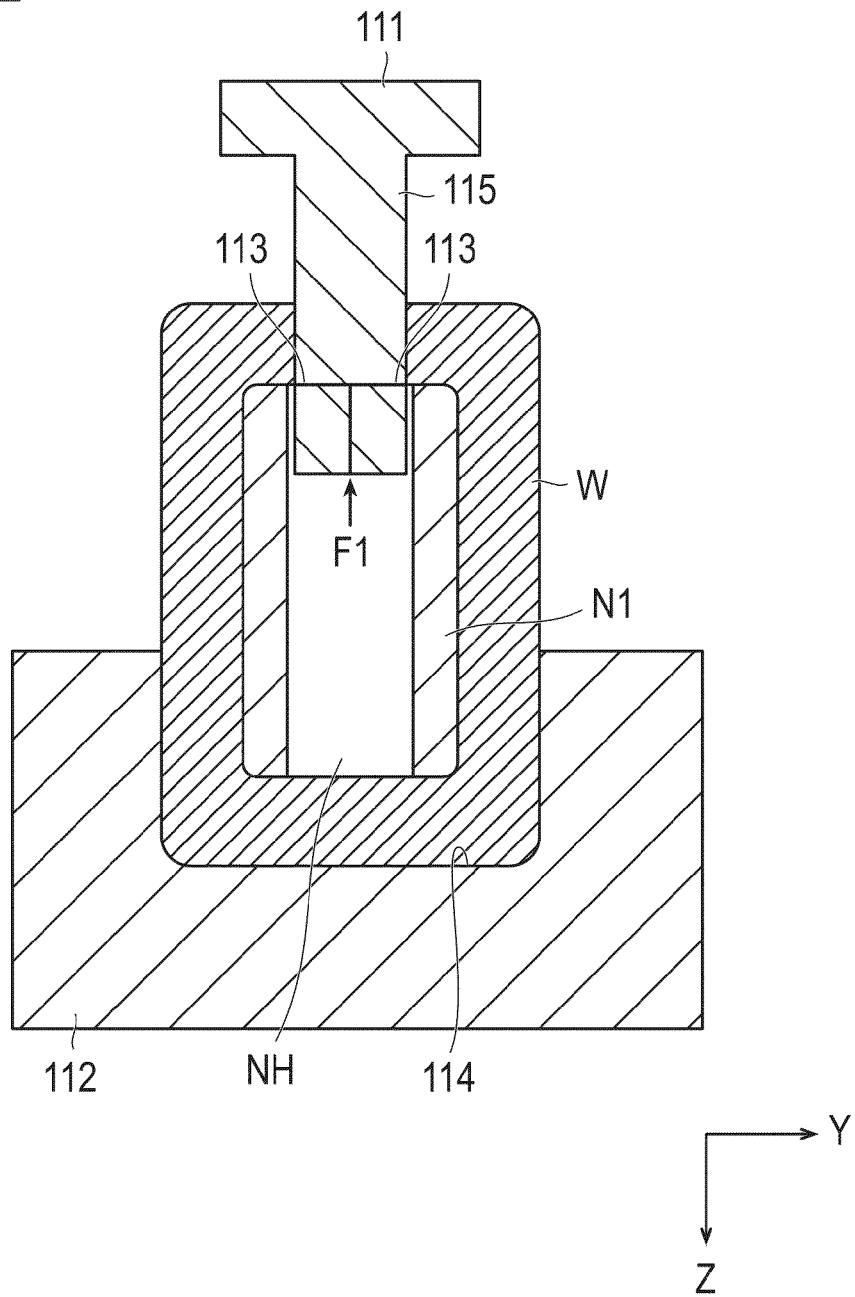
FIG. 15 is a cross-sectional view taken along a plane orthogonal to the X axis on either end in the X direction, illustrating a cutting process of the manufacturing method of the suspension arm according to the first embodiment.
Figure 16:
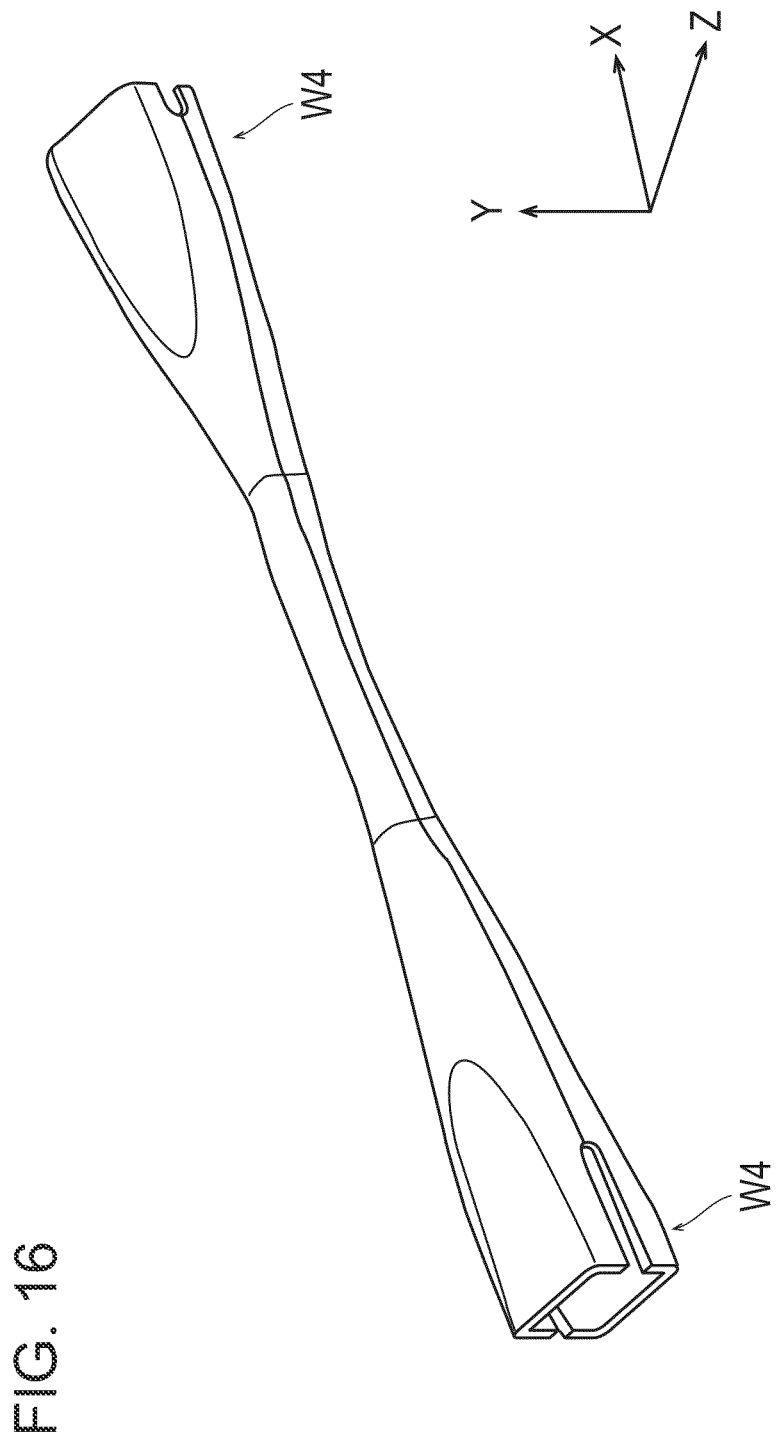
FIG. 16 is a perspective view of the workpiece when the cutting process according to the first embodiment is completed.

FIG. 15 is a cross-sectional view taken along a plane orthogonal to the X axis on either end in the X direction, illustrating the cutting process of the suspension arm 1 according to the embodiment. FIG. 16 is a perspective view of the workpiece W when the cutting process is completed.

As illustrated in FIG. 15, in the workpiece W in which the rectangular portion W4 is formed in either end in the X direction, a core N1 provided with a through hole NH in the Z direction is disposed in the rectangular portion W4, and then parts F1 and F2 of the two side portions in the Z direction of the rectangular portion W4 are sequentially cut by a seventh forming die 110. FIG. 15 illustrates a state where the part F1 of one side portion of the two side portions in the Z direction of the rectangular portion W4 is cut. The seventh forming die 110 includes a seventh upper die 111 in which a cutting blade 113 is formed in a lower portion in the Z direction, and a seventh lower die 112 which faces the seventh upper die 111 and is provides with a groove portion 114 fitted to the workpiece W. The seventh upper die 111 includes a convex portion 115, and a width of the convex portion 115 is smaller than that of the through hole NH of the core N1, so that the cutting can be made without interference.

In the cutting process, first, the core N1 is disposed in either end in the X direction of the workpiece W, and then the workpiece W is fitted to the groove portion 114 of the seventh lower die 112. Then, when the seventh upper die 111 is moved toward the seventh lower die 112, the cutting blade 113 of the seventh upper die 110 is formed such that the part F1 of one side portion of the two side portions in the Z direction of the rectangular portion W4 is cut and the cut piece falls in the through hole NH of the core N1. Similarly, the part F2 of one side portion of the two side portions in the Z direction of the rectangular portion W4 is cut.

In this way, through the cutting process, as illustrated in FIG. 16, the parts F1 and F2 of the two side portions in the Z direction of the rectangular portion W4 formed in either side in the X direction is cut.

Next, the rectangular portion W4 having cut in the parts F1 and F2 of the two side portions in the Z direction is subjected to notch processing, so that two flange portions 30 are formed along the Y direction (a notch process).

Figure 17:
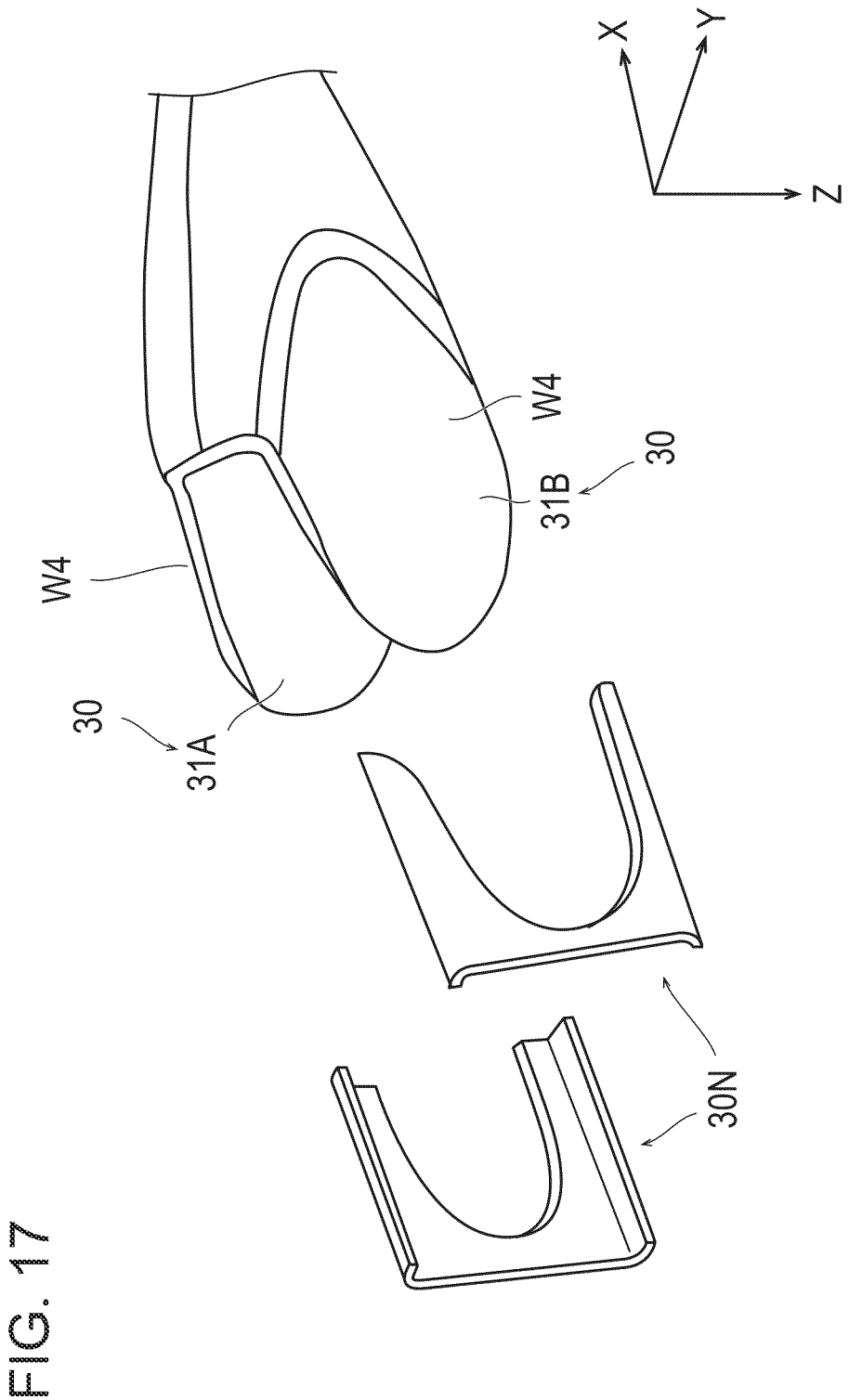
FIG. 17 is a perspective view of the workpiece when a notch process according to the first embodiment is completed.

FIG. 17 is a perspective view of the workpiece W when the notch process is completed. Further, FIG. 17 illustrates only one end in the X direction of the workpiece W.

In the notch process, as illustrated in FIG. 17, one end in the X direction of the workpiece W is subjected to the notch processing by a first notch processing device (not illustrated), unnecessary portions 30N are cut as cut pieces, and two plates 31A and 31B are formed. Similarly, the other end in the X direction of the workpiece W is subjected to the notch processing, and two plates 32A and 32B are formed. The two plates 31A and 31B and the two plates 32A and 32B form the two flange portions 30.

In this way, through the notch process, the two flange portions 30 are formed along the Y direction.

Next, the rectangular portion W4 having formed with the two flange portions 30 is subjected to pierce processing, the through holes 20H are formed at positions facing each other along the Y direction of the two flange portions 30 (a piercing process).

Figure 18:
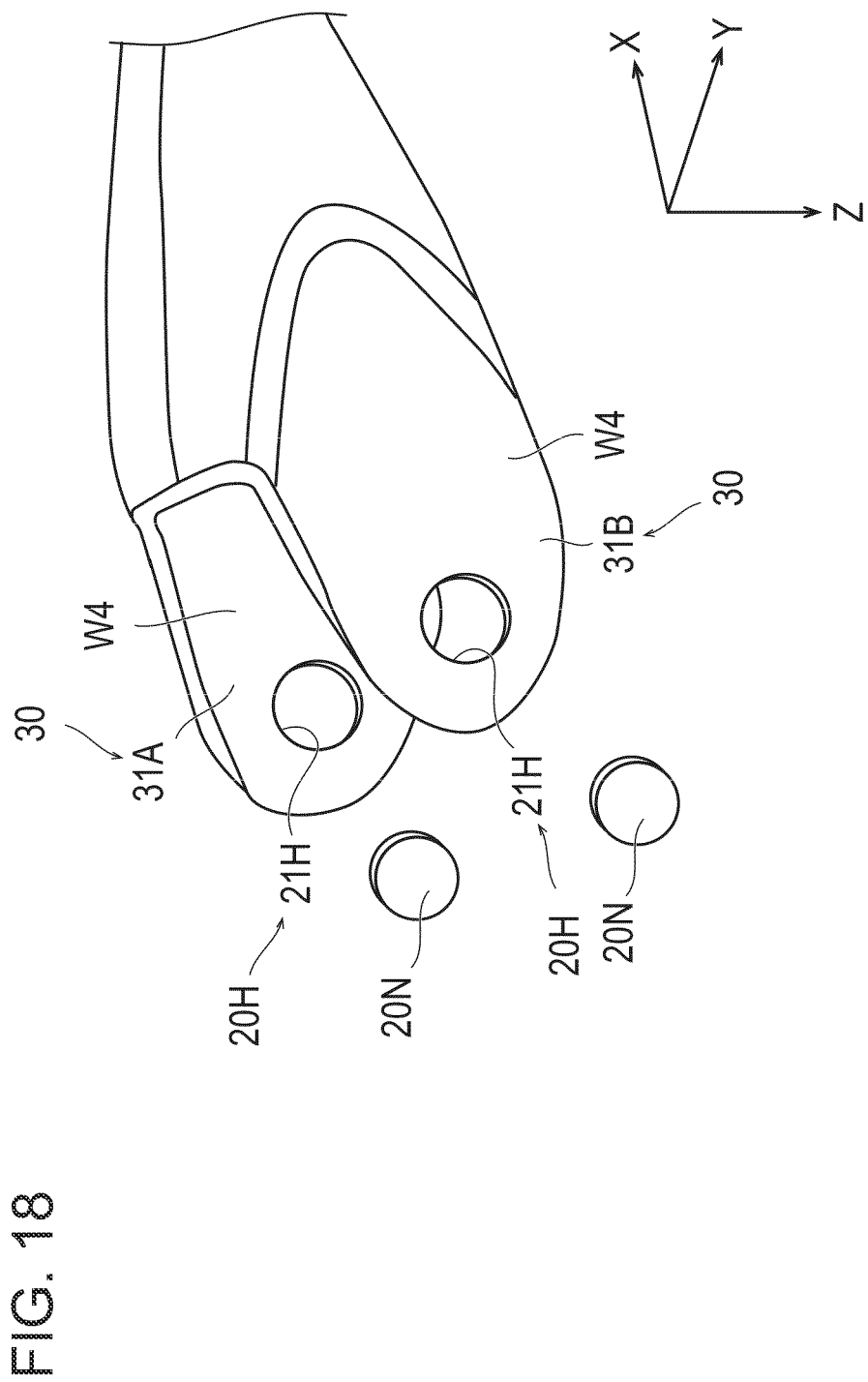
FIG. 18 is a perspective view of the workpiece when a piercing process according to the first embodiment is completed.

FIG. 18 is a perspective view of the workpiece W when the piercing process is completed. Further, FIG. 18 illustrates only one end in the X direction of the workpiece W.

In the piercing process, as illustrated in FIG. 18, one end in the X direction of the workpiece W is subjected to the pierce processing by a piercing device (not illustrated), unnecessary portions 20N are cut as cut pieces, and the through holes 21H are formed at positions facing each other along the Y direction. Similarly, the other end in the X direction of the workpiece W is subjected to the pierce processing, and the through holes 22H are formed at positions facing each other along the Y direction. The through hole 21H and the through hole 22H form the through holes 20H.

In this way, through the piercing process, the through holes 20H are formed at positions facing each other along the Y direction of the two flange portions 30.

Through the above processes, the suspension arm 1 is manufactured. The suspension arm 1 includes the cylindrical portion 10 which is provided along the X direction and has a cylindrical shape, the bracket portions 20 which are provided in either end in the X direction of the cylindrical portion 10 and have an outer diameter expanding as it goes to the outside in the X direction, and the two flange portions 30 which are provided to face each other along the Y direction in the bracket portion 20 and include the through holes 20H at positions facing each other along the Y direction.

Next, the vulnerable portion 11 having a rigidity weaker than that of any other portions of the cylindrical portion 10 is formed in the vicinity of the center of the cylindrical portion 10 (a vulnerable portion forming process).

Figure 19:
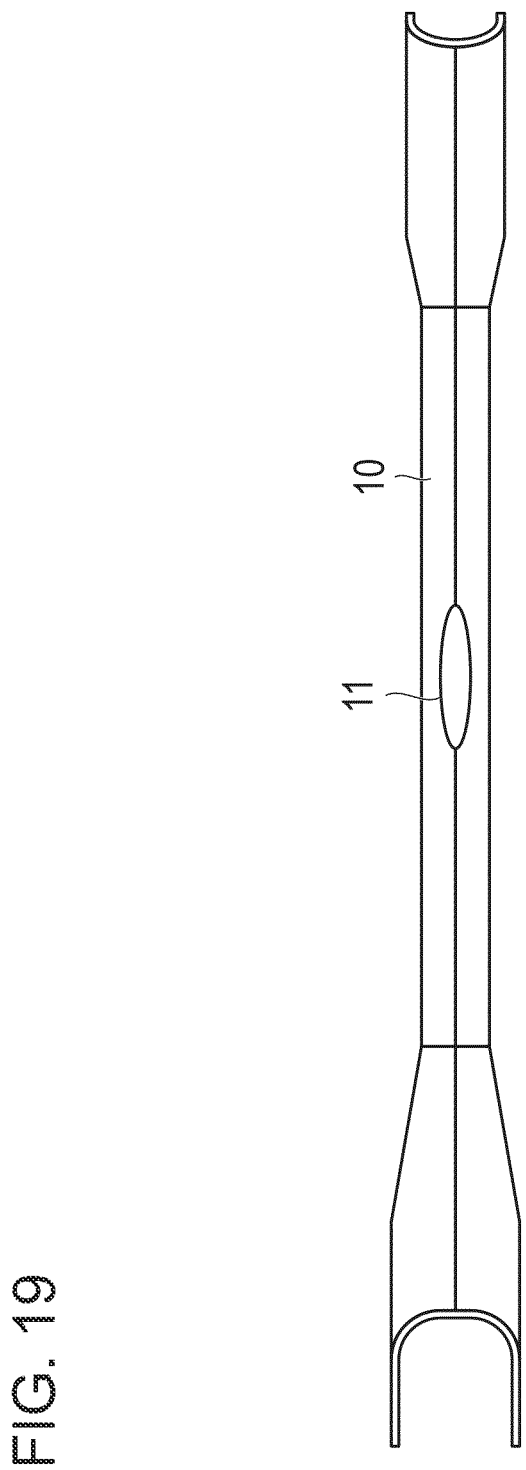
FIG. 19 is a perspective view of the workpiece when a vulnerable portion forming process according to the first embodiment is completed.

FIG. 19 is a top view of the workpiece W when the vulnerable portion forming process is completed.

In the vulnerable portion forming process, as illustrated in FIG. 19, the vicinity of the center of the cylindrical portion 10 is cut by a second notch processing device (not illustrated), and the vulnerable portion 11 is formed in the vicinity of the center of the cylindrical portion 10.

Through the above process, the suspension arm 1 is manufactured.

As described above, the suspension arm 1 according to the embodiment is the suspension arm 1 which is molded such that the workpiece W (the flat plate) extending in the XY plane formed by the X direction and the Y direction is subjected to the press processing in stages so as to butt and joint the two side surfaces W1 and W2 in the Y direction to each other. The suspension arm 1 includes the cylindrical portion 10 which is provided along the X direction and has the cylindrical shape, the bracket portions 20 which are provided in either end in the X direction of the cylindrical portion 10 and have the outer diameter expanding as it goes to the outside in the X direction, and the two flange portions 30 which are provided to face each other along the Y direction of the bracket portion 20 and include the through holes 20H at positions facing each other along the Y direction. Therefore, the outer diameter of the bracket portion 20 is molded to be larger as it goes to the outside in the X direction by subjecting the workpiece W (the flat plate) to the press processing, so that it is possible to provide the suspension arm 1 which is easily manufactured and advantageous in reducing the cost without causing a steep change in the cross section.

In addition, the cylindrical portion 10 includes the vulnerable portion 11 having a rigidity weaker than that of any other portions of the cylindrical portion 10. Therefore, when the compressive load of a predetermined value or more is applied to the suspension arm 1, it is possible to make buckling in the vulnerable portion 11.

In addition, the vulnerable portion 11 is formed by the peripheral wall hole which is formed in the peripheral wall of the cylindrical portion 10. Therefore, since the rigidity of the vulnerable portion 11 can be appropriately set according to the size of the peripheral wall hole, the compressive load causing the buckling in the suspension arm 1 can be freely set.

In addition, when it is assumed that the diameter of the end portion of the cylindrical portion 10 is d1, the maximum diameter of the bracket portion 20 is d2, and the distance from the end portion of the cylindrical portion 10 to the position corresponding to the maximum diameter of the bracket portion 20 is L, the expanding rate $\alpha$ (expressed by $\alpha=(d2-d1)/L$) becomes smaller than $\frac{1}{3}$. Therefore, since the outer diameter of the bracket portion 20 is smoothly changed, it is possible to provide the suspension arm 1 of which the cross section is not steeply changed.

In addition, as described above, the manufacturing method of the suspension arm 1 according to the embodiment is the manufacturing method of the suspension arm 1 in which the two side surfaces W1 and W2 of the workpiece W in the XZ plane formed by the X direction and the Z direction are butted and jointed to each other by subjecting the workpiece W (the flat plate) extending in the XY plane formed by the X direction and the Y direction to the press processing in stages so as to form the suspension arm 1, having the hollow shape. Then, the manufacturing method includes a process of forming the extrusion portion P such that the workpiece is extruded in the Z direction and extended while being expanded to the outside in the X direction except the non-extrusion portion NP of the workpiece W in the YZ plane, and a process of bringing the two side surfaces W1 and W2 in contact with each other by subjecting the non-extrusion portion NP to the press processing along the bending shape of the extrusion portion P in the YZ plane. Furthermore, the manufacturing method includes a process of forming the rectangular portion W4 in either end in the X direction by performing the press processing in the state where the core N is disposed in either end in the X direction, and a process of cutting the parts F1 and F2 of the two side portions in the Z direction of the rectangular portion W4. Furthermore, the manufacturing method includes a process of forming the two flange portions 30 along the Y direction by subjecting the rectangular portion W4 having cut in the parts F1 and F2 of the two side portions to the notch processing, and a process of forming the through holes 20H at positions facing each other along the Y direction of the two flange portions 30 by subjecting the rectangular portion W4 having formed with the two flange portions 30 to the pierce processing. Therefore, it is possible to easily manufacture the suspension arm 1 according to the embodiment at a low cost.

In addition, after the process of bringing the two side surfaces W1 and W2 in contact with each other, a process of forming the vulnerable portion 11 having rigidity weaker than that of any other portions may be further included. Therefore, when the compressive load of the predetermined value or more is applied to the suspension arm 1, buckling can occur in the vulnerable portion 11.

<Second Embodiment>

Next, a second embodiment of the invention will be described. The portions in common with the first embodiment will not be described, and only the characteristic points of the second embodiment will be described. Further, the same members as those in the first embodiment described above will be denoted with the same symbols, and the descriptions thereof will not be repeated. The second embodiment is different from the first embodiment in that two side surfaces S1 and S2 in the Y direction are separated in the vicinity of either end in the X direction.

Figure 20:
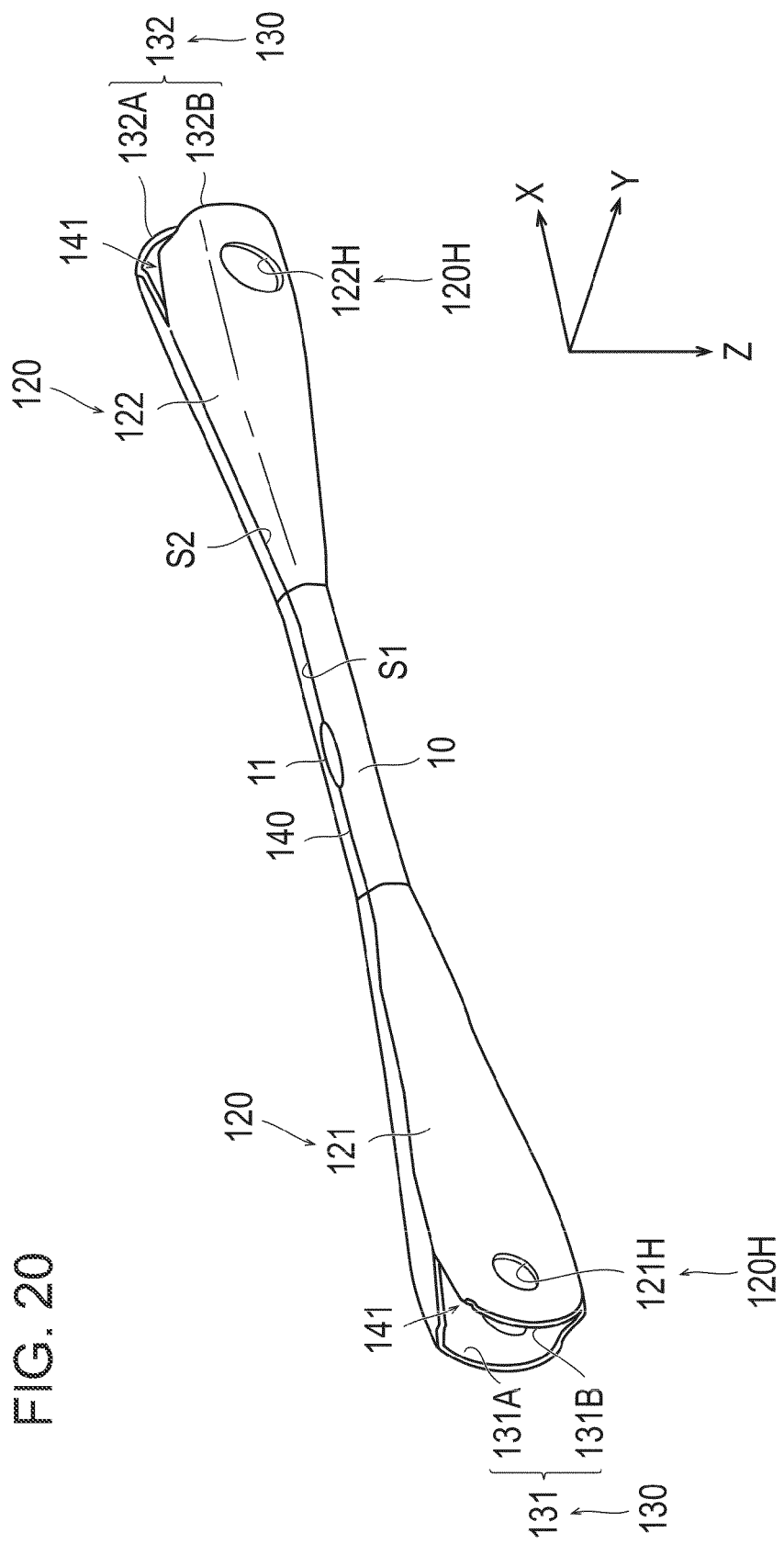
FIG. 20 is a perspective view illustrating a suspension arm according to a second embodiment of the invention.

FIG. 20 is a perspective view illustrating a suspension arm 2 according to the second embodiment of the invention.

In short, the suspension arm 2 according to the embodiment, as illustrated in FIG. 20, includes the cylindrical portion 10 which is provided in a cylindrical shape along the X direction, a bracket portion 120 which is provided on either end in the X direction of the cylindrical portion 10 and has an outer diameter expanding as it goes to the outside in the X direction, and two flange portions 130 which are provided in the bracket portion 120 to face each other along the Y direction and include through holes 120H at positions facing each other along the Y direction.

The bracket portion 120 includes a first bracket portion 121 which is provided in the left end of the cylindrical portion 10 and a second bracket portion 122 which is provided in the right end of the cylindrical portion 10.

The flange portion 130 includes a first flange portion 131 which is provided in the left end of the first bracket portion 121 and a second flange portion 132 which is provided in the right end of the second bracket portion 122.

The first flange portion 131 includes two plates 131A and 131B which are provided to face each other along the Y direction and include first through holes 121H at positions facing each other along the Y direction.

The second flange portion 132 includes two plates 132A and 132B which are provided to face each other along the Y direction and include second through holes 122H at positions facing each other along the Y direction.

The two side surfaces S1 and S2 in the Y direction include a bonding portion 140 which is butted and jointed when viewed from the Z direction, and a separation portion 141 which is provided in either end of the bonding portion 140 in the X direction and separated while being expanded to the outside in the X direction.

The bonding portion 140 is bonded by welding in the X direction except the vulnerable portion 11. The separation portion 141 is formed in an approximate V shape to be separated while being expanded to the outside in the X direction.

Next, a manufacturing method of the suspension arm 2 according to the embodiment will be described with reference to FIGS. 21 to 29.

Figure 21:
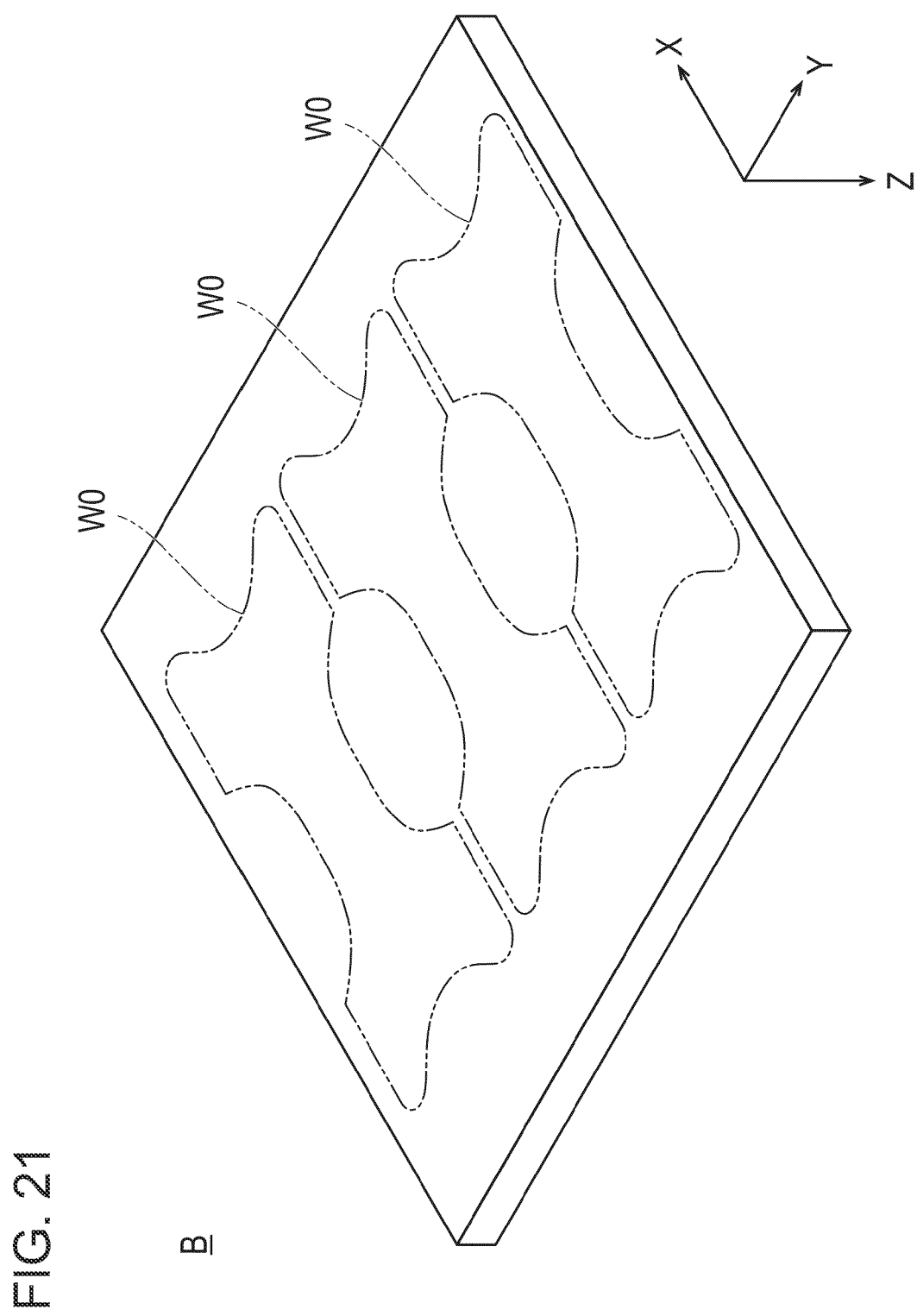
FIG. 21 is a perspective view illustrating a base plate (the flat plate) before press processing performed on the suspension arm according to the second embodiment.

FIG. 21 is a diagram illustrating a base plate B (a rectangular flat plate) before the press processing of the suspension arm 2 according to the embodiment.

First, the base plate B (the rectangular flat plate) is cut to form a workpiece W0 which is substantially parallel to the X direction in the vicinity of the center in the X direction, and substantially parallel to the X direction in the vicinity of either end while being expanded to the outside in the X direction when viewed from the Z direction (a trimming process).

In this embodiment, three workpieces W0 are obtained from the base plate B. At this time, since the workpieces W0 are formed to be substantially parallel to the X direction in the vicinity of either end, the workpieces W0 can be obtained with efficiency. Further, this embodiment has been described about that three workpieces W0 are obtained from the base plate B, but the invention is not limited thereto.

Figure 22:
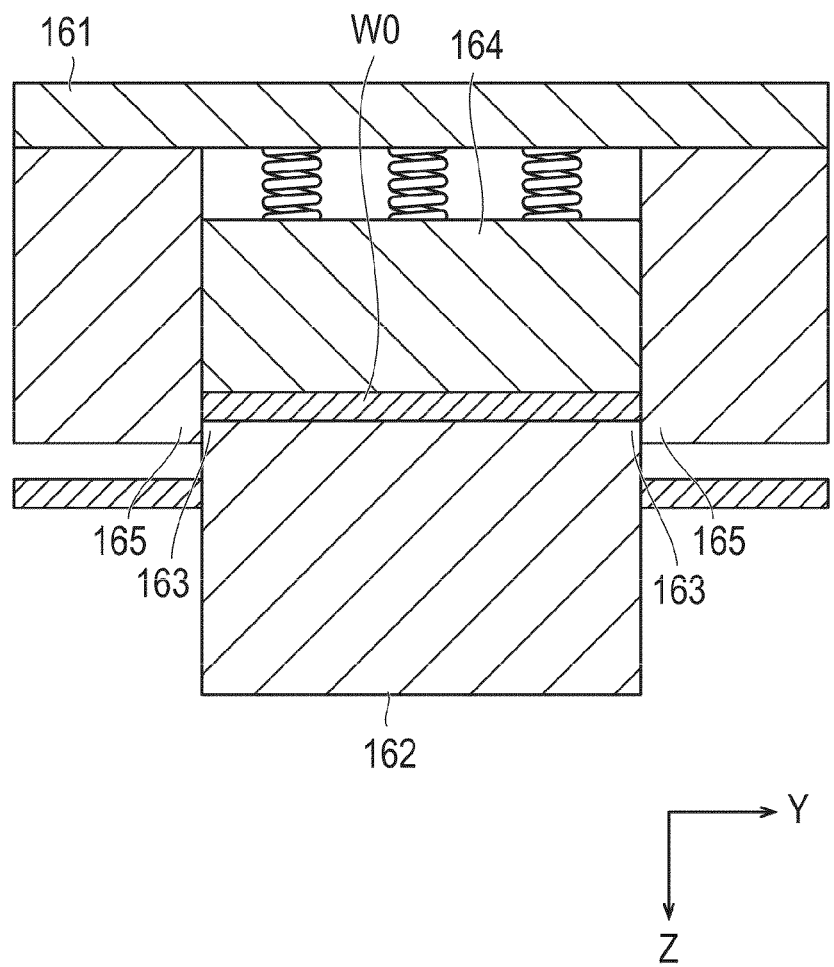
FIG. 22 is a cross-sectional view taken along a plane orthogonal to the X axis, illustrating a trimming process of a manufacturing method of the suspension arm according to the second embodiment.

FIG. 22 is a cross-sectional view taken along a plane orthogonal to the X axis, illustrating the trimming process of the manufacturing method of the suspension arm 2 according to the embodiment. FIG. 23 is a top view of the workpiece W0 when the trimming process is completed.

As illustrated in FIG. 22, the base plate B is trimmed by an eighth forming die 160. The eighth forming die 160 includes a second upper die 161 and a second lower die 162. In the second lower die 162, a lower-die cutting blade 163 is formed at the outer peripheral end of the surface facing the second upper die 161. In the second upper die 161, a holder portion 164 is provided to face the second lower die 162 and provided with springs in the rear surface to be urged in a direction toward the second lower die 162. Further, an upper-die cutting blade 165 is provided in the outer peripheral of the holder portion 164 to pair up with the lower-die cutting blade 163. The second lower die 162 and the holder portion 164 are formed in a shape corresponding to a desired shape of the base plate B.

The trimming method in the trimming process according to the embodiment is the same as the trimming method in the trimming process according to the first embodiment, and thus the description will not be repeated herein.

In this way, through the trimming process, the base plate B is trimmed, the workpiece W0 is formed, and the two side surfaces S1 and S2 are formed along the Y direction. As illustrated in FIG. 23A, the trimmed workpiece W0 is substantially parallel to the X direction in the vicinity of the center, and substantially parallel to the X direction in the vicinity of either end while being expanded to the outside in the X direction. In addition, a concave portion S3 dented to the inside in the X direction is provided in either end portion in the X direction. With the above-mentioned configuration, the separation portion 141 is formed in the workpiece W0 as described below.

Figure 23B:
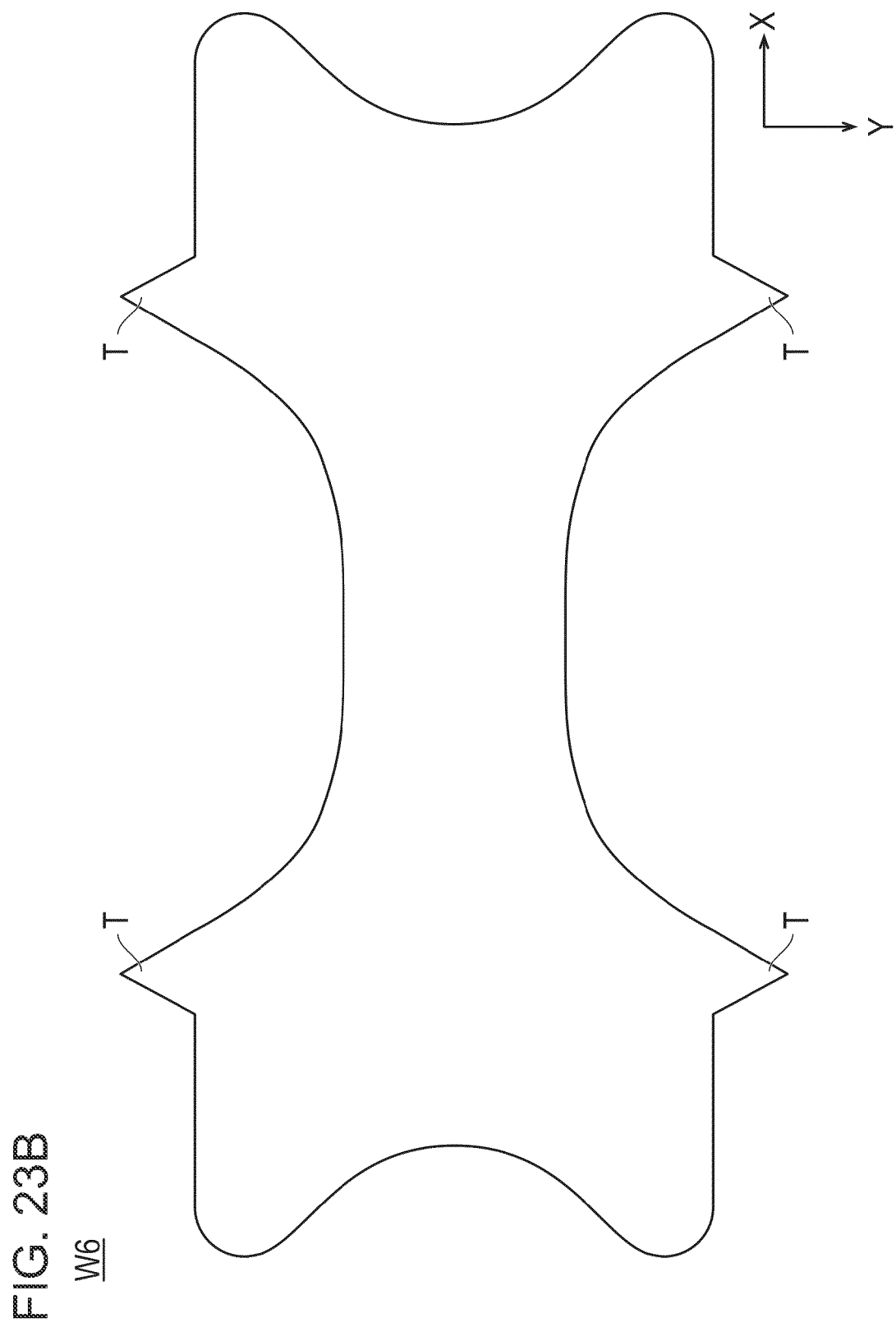
FIG. 23B is a top view of the workpiece in a case where a separation portion is not formed as a comparative example.

FIG. 23B is a top view of a workpiece W6 in a case where the separation portion 141 is not formed as a comparative example. In a case where the separation portion 141 is not formed, a protruding portion T which protrudes in the Y direction is necessary in the workpiece W6 as illustrated in FIG. 23B. In a case where the workpiece W0 according to the embodiment is compared to the workpiece W6 according to the comparative example, a yield of the material is improved in proportion to an amount corresponding to the protruding portion T.

Next, the trimmed workpiece W0 is bent (a bending process). In the bending process, the workpiece W0 is subjected to the press processing to form an extrusion portion P5 which is extruded to the Z direction in the YZ plane and extended while being expanded to the outside in the X direction.

Figure 24A:
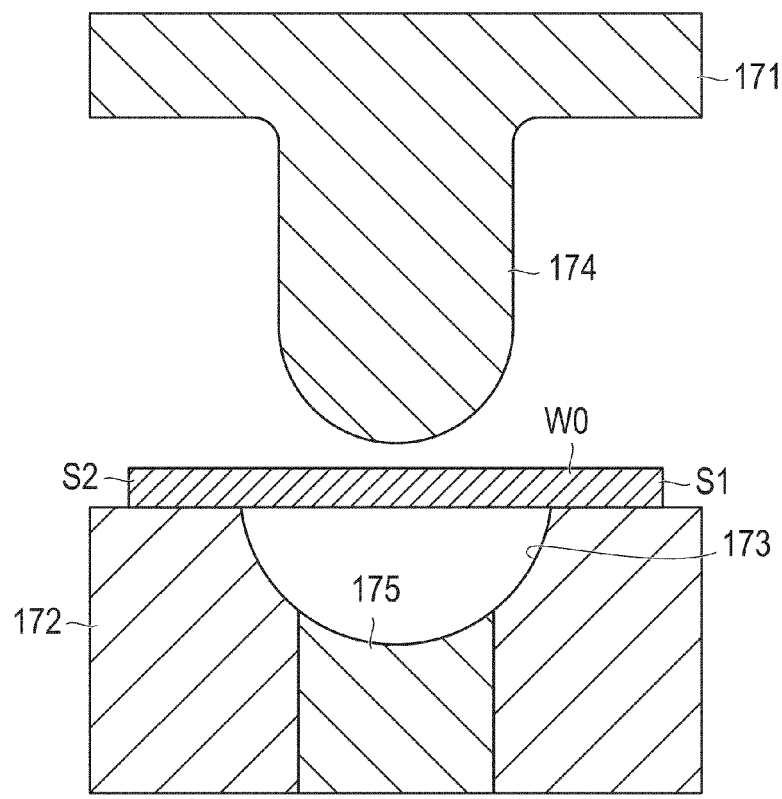
FIG. 24(A) illustrates a state before the bending process and FIG. 24(B) illustrates a state when the bending process is completed.
Figure 24B:
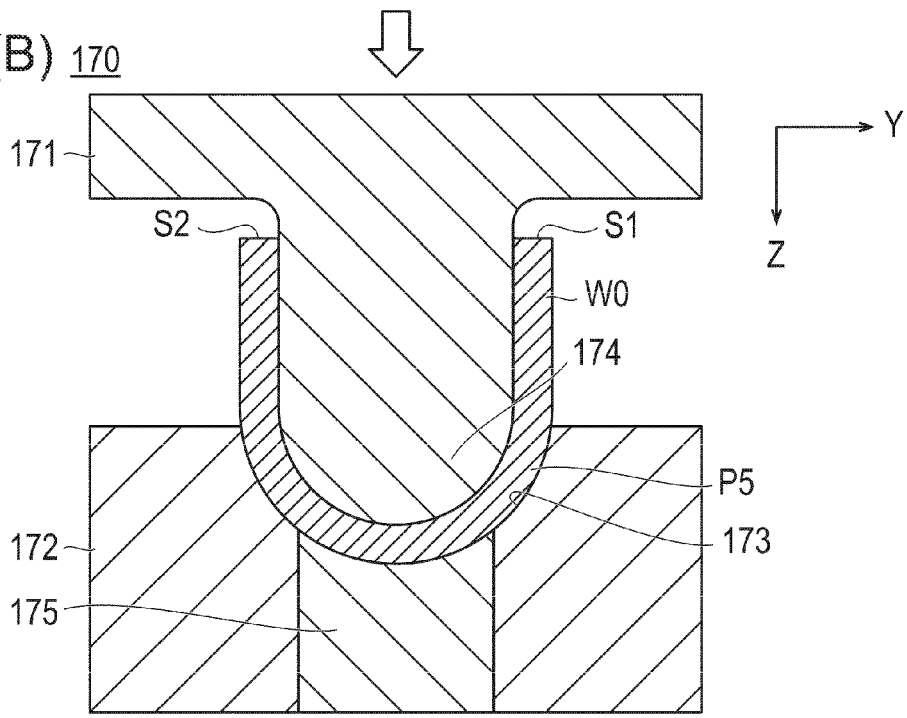
Figure 25:
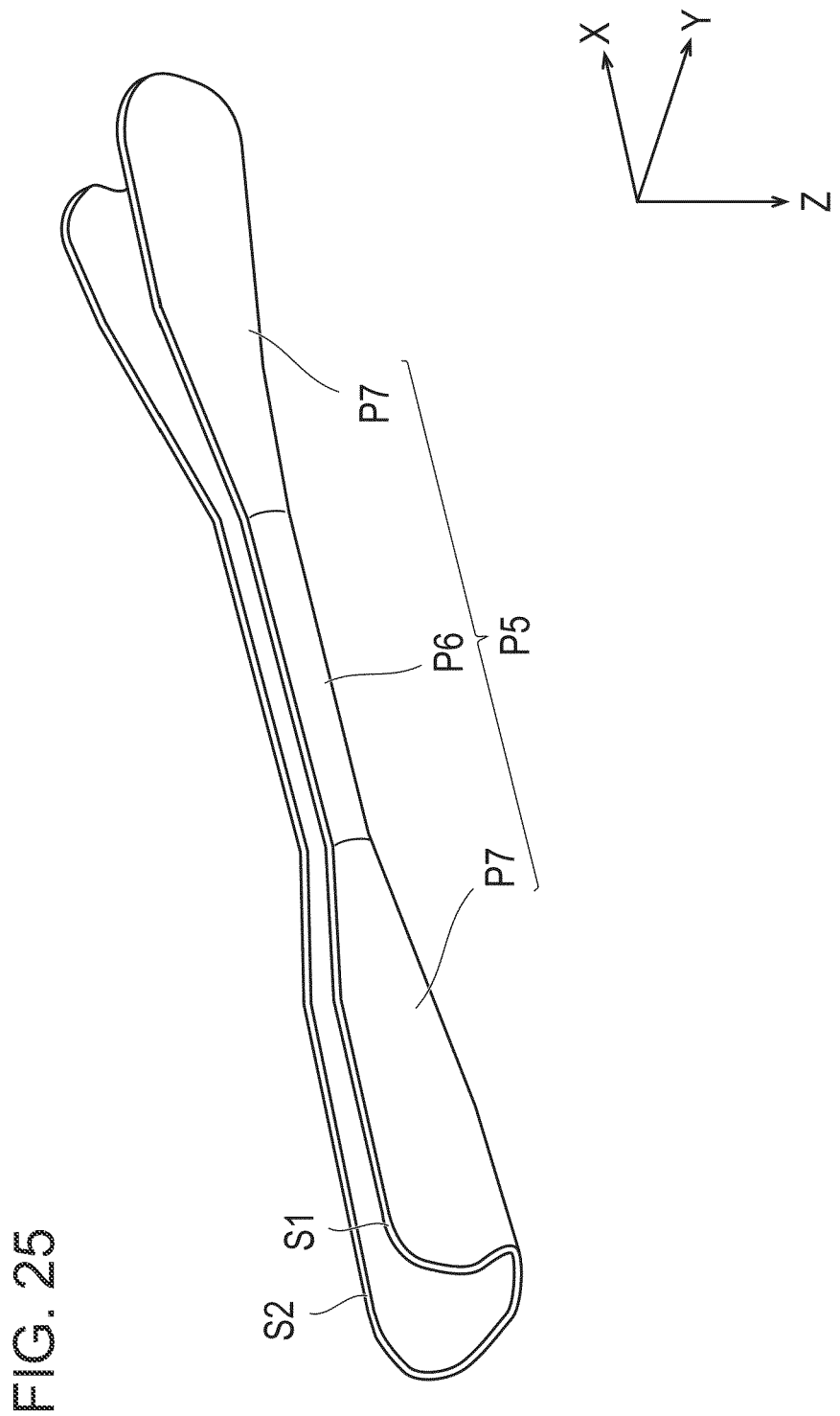
FIG. 25 is a perspective view of the workpiece when the bending process according to the second embodiment is completed.

FIG. 24 is a cross-sectional view taken along a plane orthogonal to the X axis, illustrating the bending process of the manufacturing method of the suspension arm 2 according to the embodiment. FIG. 24(A) illustrates a state before the bending process, and FIG. 24(B) illustrates a state when the bending process is completed. FIG. 25 is a perspective view of the workpiece W0 when the bending process is completed.

As illustrated in FIGS. 24(A) and 24(B), the trimmed workpiece W0 is bent by a ninth forming die 170. The ninth forming die 170 includes a ninth lower die 172 in which a groove portion 173 fitted to the workpiece W0 is formed and a ninth upper die 171 in which a convex portion 174 fitted to the groove portion 173 is formed. In addition, the ninth lower die 172 is provided with a projecting portion 175 which is used to cause the workpiece W0 molded from the groove portion 173 to protrude.

In the bending process, first, the trimmed workpiece W0 is provided in the ninth forming die 170 (see FIG. 24(A)). Then, by bringing the ninth upper die 171 and the ninth lower die 172 in close contact with each other, the extrusion portion P5 which protrudes in a direction toward the ninth lower die 172 is formed in the workpiece W0 corresponding to the shapes of the convex portion 174 of the ninth upper die 171 and the groove portion 173 of the ninth lower die 172 (see FIG. 24(B)). As described above, the workpiece W0 is trimmed in a shape to be substantially parallel to the X direction in the vicinity of the center and substantially parallel to the X direction in the vicinity of either end while being expanded to the outside in the X direction through the trimming process. For this reason, the extrusion portion P5 includes a first extrusion portion P6 which is formed in the vicinity of the center in the X direction and has the same shape in the X direction, and a second extrusion portion P7 which is formed in either end in the X direction of the first extrusion portion P6 and expanded to the outside in the X direction.

Then, the workpiece W0 molded by the ninth forming die 170 is formed to protrude from the groove portion 173 by the projecting portion 175.

In this way, through the bending process, as illustrated in FIG. 25, the extrusion portion P5 is formed to be extended while being expanded to the outside in the X direction, and an orthogonal direction of the two side surfaces S1 and S2 is bent upward in the Z direction.

Next, in a state where a pair of cores N5 and N6 is inserted to the workpiece W0 from the both sides in the X direction, the workpiece W0 is subjected to the press processing, and a rectangular portion W5 is formed in either end in the X direction while making the two side surfaces S1 and S2 abut on each other (an abutting process).

Figure 26:
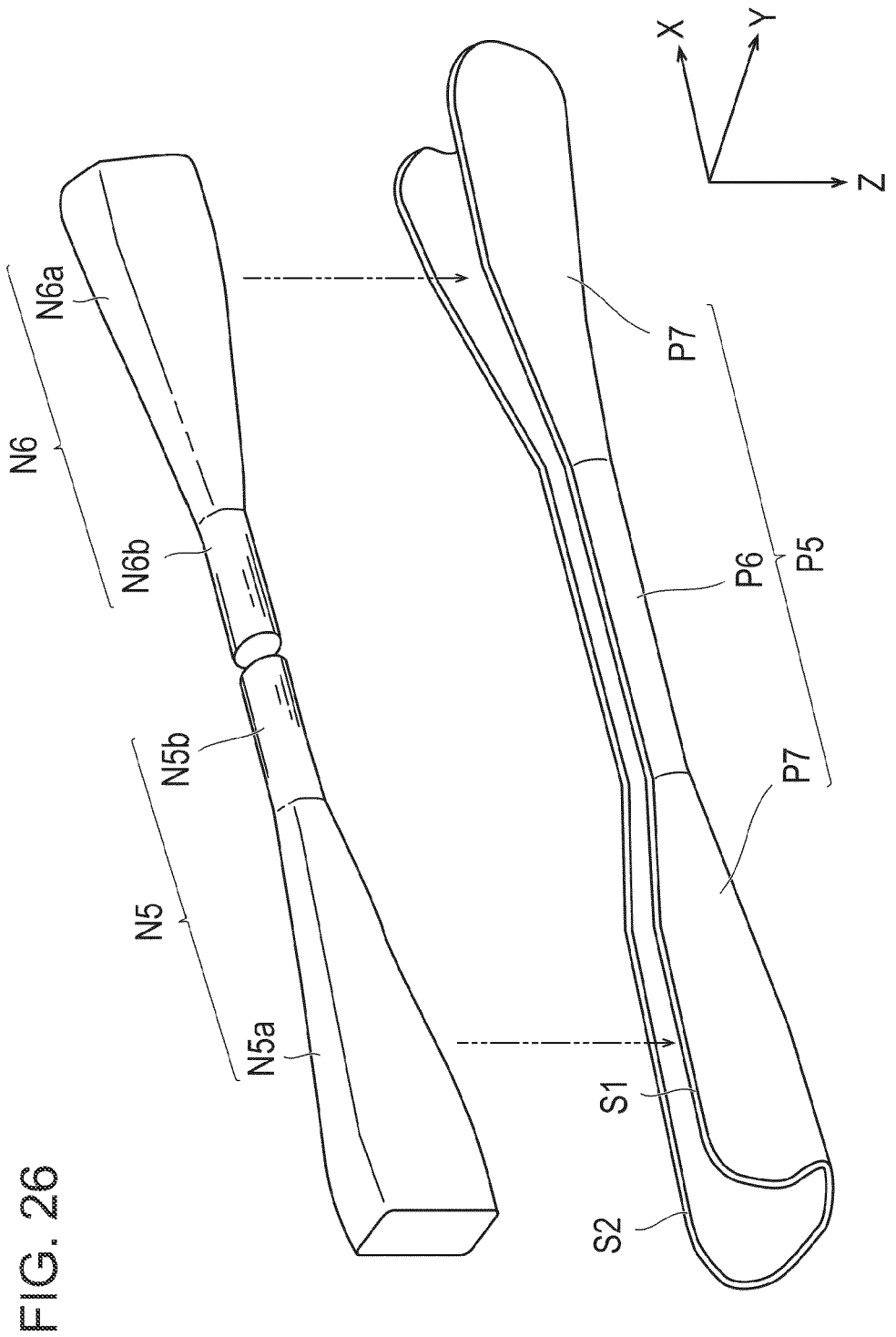
FIG. 26 is a perspective view illustrating a state where a pair of cores is inserted into the workpiece in an abutting process of the manufacturing method of the suspension arm according to the second embodiment.
Figure 27A:
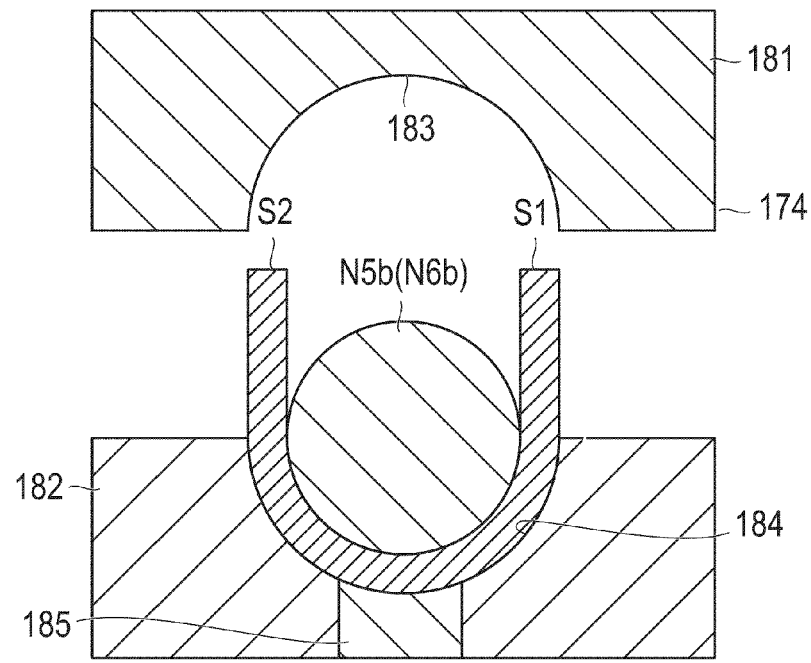
FIG. 27(A) illustrates a state before the abutting process and FIG. 27(B) illustrates a state after the abutting process is completed.
Figure 27B:
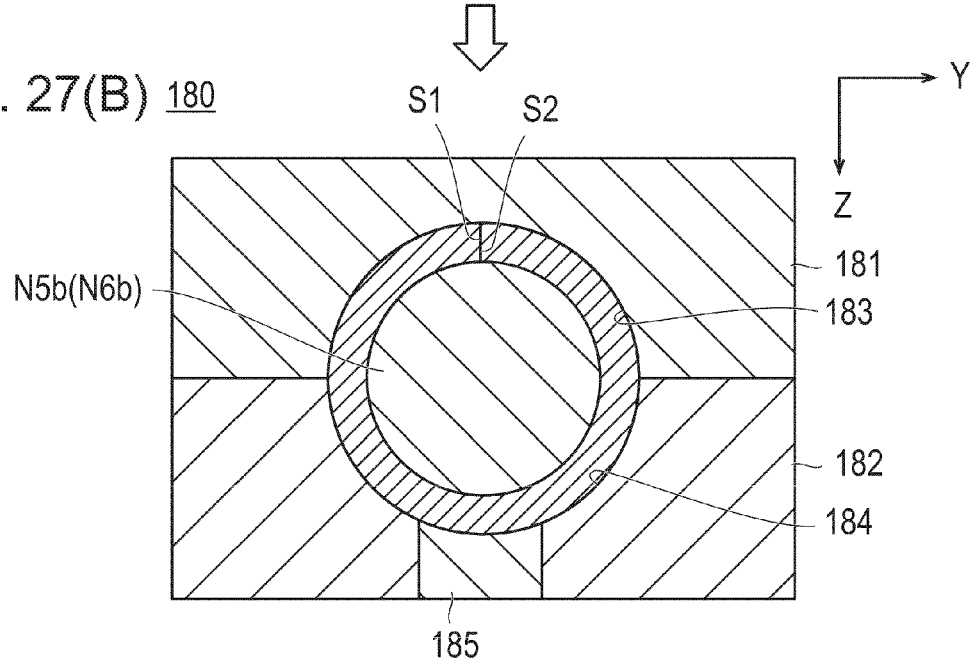
Figure 28A:
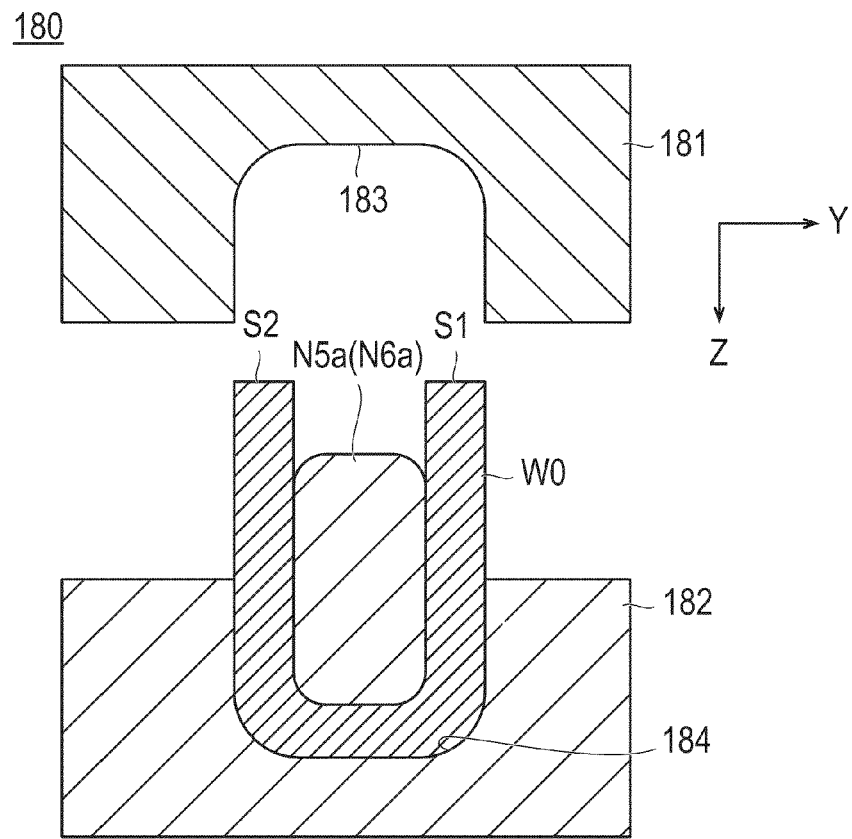
FIG. 28(A) illustrates a state before the abutting process and FIG. 28(B) illustrates a state after the abutting process is completed.
Figure 28B:
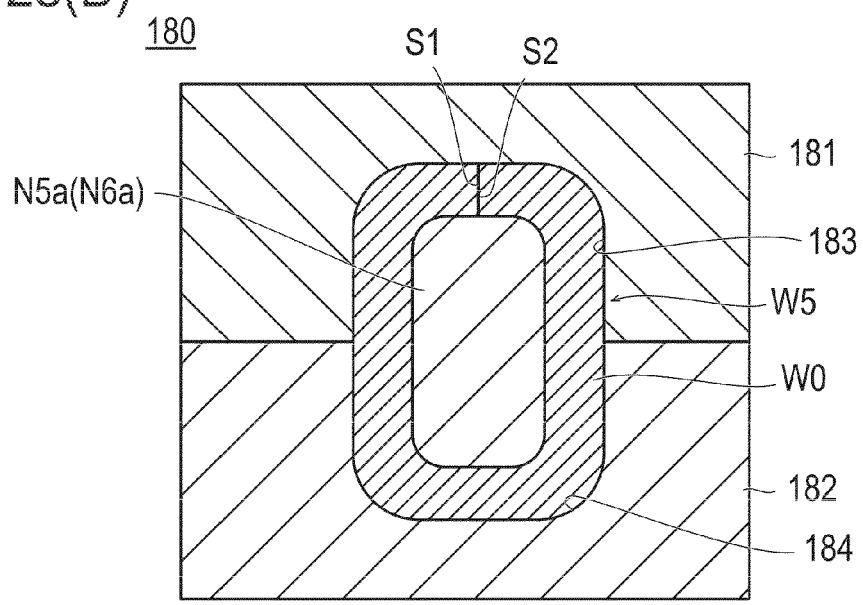

FIG. 26 is a perspective view illustrating a state where the pair of cores N5 and N6 is inserted into the workpiece W0 in an abutting process of the manufacturing method of the suspension arm 2 according to the this embodiment. FIG. 27 is a cross-sectional view taken along a plane orthogonal to the X axis near the center in the X direction, illustrating the abutting process of the manufacturing method of the suspension arm 2 according to the this embodiment. FIG. 27(A) illustrates a state before the abutting process, and FIG. 27(B) illustrates a state after the abutting process is completed. FIG. 28 is a cross-sectional view taken along a plane orthogonal to the X axis in the vicinity of either end in the X direction, illustrating the abutting process of the manufacturing method of the suspension arm 2 according to the this embodiment. FIG. 28(A) illustrates a state before the abutting process, and FIG. 28(B) illustrates a state after the abutting process is completed. FIG. 29 is a perspective view of the workpiece W0 when the abutting process according to the second embodiment is completed.

First, as illustrated in FIG. 26, the pair of cores N5 and N6 is inserted to the workpiece W0 bent through the bending process. The pair of cores N5 and N6 includes the first core N5 which is inserted to the left side in the X direction in FIG. 26 and the second core N6 which is inserted to the right side in the X direction. The first core N5 and the second core N6 have the same shape. Further, the first core N5 and the second core N6 may have different shapes.

The first core N5 includes a rectangular core N5a which is provided on the left side in the X direction and has a rectangular cross section orthogonal to the X axis in FIG. 26 and a circular core N5b which is provided on the right side in the X direction and has a circular cross section orthogonal to the X axis. Similarly, the second core N6 includes a rectangular core N6a and a circular core N6b.

As illustrated in FIGS. 27 and 28, the workpiece W0 with the pair of cores N5 and N6 inserted therein is subjected to the press processing by a tenth forming die 180, and the rectangular portion W5 is formed in either end in the X direction while making the two side surfaces S1 and S2 abut on each other.

First, the configuration of the tenth forming die 180 in the vicinity of the center in the X direction will be described with reference to FIG. 27. The tenth forming die 180 includes a tenth upper die 181 in which an upper-die groove portion 183 fitted to the workpiece W0 is formed, and a tenth lower die 182 which faces the tenth upper die 181 and is provided with a lower-die groove portion 184 fitted to the workpiece W0. In addition, in the tenth lower die 182, a projecting portion 185 is provided to protrude the molded workpiece W0 from the lower-die groove portion 184. The upper-die groove portion 183 and the lower-die groove portion 184 in the vicinity of the center in the X direction each are formed in an almost semicircular shape.

Next, the configuration of the tenth forming die 180 in the vicinity of the center in the X direction will be described with reference to FIG. 28. The tenth forming die 180 includes a tenth upper die 181 in which an upper-die groove portion 183 fitted to the workpiece W0 is formed, and a tenth lower die 182 which faces the tenth upper die 181 and is provided with a lower-die groove portion 184 fitted to the workpiece W0. The upper-die groove portion 183 and the lower-die groove portion 184 in the vicinity of either end in the X direction each are formed in a rectangular shape.

In the abutting process, first, the workpiece W0 with the pair of cores N5 and N6 inserted is disposed in the tenth forming die 180 such that the portion of the provided two side surfaces S1 and S2 faces the tenth upper die 181 (see FIGS. 27(A) and 28(A)). Then, the tenth upper die 181 and the tenth lower die 182 are brought in proximity to each other. Since the workpiece W0 is molded to be long in the Z direction between the upper-die groove portion 183 and the lower-die groove portion 184, when the tenth upper die 181 and the tenth lower die 182 are brought in proximity to each other, the two side surfaces S1 and S2 abut on each other while moving along the wall surface of the upper-die groove portion 183 (see FIGS. 27(B) and 28(B)).

At this time, as described above, the workpiece W0 is trimmed in a shape to be substantially parallel to the X direction in the vicinity of the center and substantially parallel to the X direction in the vicinity of either end while being expanded to the outside in the X direction through the trimming process. For this reason, when the tenth upper die 181 and the tenth lower die 182 are brought in proximity to each other, the two side surfaces S1 and S2 do not come in point contact with the tenth upper die 181. Therefore, it is possible to prevent partial friction of the tenth upper die 181.

Then, after a contact portion between the two side surfaces S1 and S2 is bonded by welding, the workpiece W0 molded by the tenth forming die 180 is protruded from the groove portion 184 by the projecting portion 185.

In this way, through the abutting process, as illustrated in FIG. 29, the rectangular portion W5 is formed in either end in the X direction while the two side surfaces S1 and S2 abut on each other. In addition, as described above, the workpiece W0 is trimmed through the trimming process in a state where the workpiece is substantially parallel to the X direction in the vicinity of the center, and substantially parallel to the X direction in the vicinity of either end while being expanded to the outside in the X direction. Therefore, when abutting on each other, the two side surfaces S1 and 32 are gradually separated in the vicinity of either end in the X direction. In other words, when the two side surfaces S1 and S2 is butted and jointed to each other, the two side surfaces S1 and S2 include when viewed from the Z direction, the bonding portion 140 which is butted and jointed, and the separation portion 141 which is provided in either end in the X direction of the bonding portion 140 and separated while being expanded to the outside in the X direction.

In addition, since the concave portion S3 dented to the inside in the X direction is formed in either end portion in the X direction in the trimming process, two flange portions 130 are formed in both end portions of the workpiece W0 after the abutting process similarly to the case after the notch processing in the first embodiment.

Next, similarly to the first embodiment, in the piercing process, the through holes 120H are formed at positions facing each other along the Y direction of two flange portions 130. In the vulnerable portion forming process, the vulnerable portion 11 which is vulnerable in rigidity compared to the other portions of the cylindrical portion 10 is formed in the vicinity of the center of the cylindrical portion 10.

The piercing process and the vulnerable portion forming process according to the embodiment are the same as those according to the first embodiment, and thus the descriptions thereof will not be repeated.

Through the above processes, the suspension arm 2 according to the embodiment is manufactured.

As described above, in the suspension arm 2 according to the embodiment, when viewed from the Z direction, the two side surfaces S1 and S2 include the bonding portion 140 which is butted and jointed and the separation portion 141 which is provided in either end of the bonding portion 140 in the X direction and separated while being expanded to the outside in the X direction. Therefore, it is possible to reduce the suspension arm 2 in weight. In addition, the yield of the material is improved.

In addition, as described above, the manufacturing method of the suspension arm 2 according to the embodiment is a manufacturing method of the suspension arm 2 in which the two side surfaces S1 and S2 of the workpiece W0 in the XZ plane formed by the X direction and the Z direction are butted and jointed to each other by subjecting the workpiece W0 (the flat plate) extending in the XY plane formed by the X direction and the Y direction to the press processing in stages so as to form the suspension arm 2 having the hollow shape. The manufacturing method of the suspension arm 2 includes a process of forming the extrusion portion P5 which is extruded to the Z direction in the YZ plane formed by the Y direction and the Z direction by subjecting the workpiece W0 to the press processing and extended while being expanded to the outside in the X direction, a process of forming the rectangular portion W5 in either end in the X direction while making the two side surfaces S1 and S2 abut on each other by subjecting the workpiece W0 to the press processing in the state where the pair of cores N5 and N6 is inserted in the workpiece W0 from either side in the X direction, and a process of forming the through holes 120H at positions facing each other along the Y direction of the rectangular portion W5 by subjecting the rectangular portion W5 to the pierce processing. Therefore, the suspension arm 2 according to the embodiment can be easily manufactured at a low cost. Furthermore, the suspension arm 2 can be manufactured through a less number of processes compared to the manufacturing method of the suspension arm 1 according to the first embodiment.

In addition, before the process of forming the extrusion portion P5, the manufacturing method further includes a process of cutting the base plate B (the rectangular flat plate) to form a workpiece W0 which is substantially parallel to the X direction in the vicinity of the center in the X direction, and substantially parallel to the X direction in the vicinity of either end while being expanded to the outside in the X direction when viewed from the Z direction. The two side surfaces S1 and S2 include the bonding portion 140 which is butted and jointed when viewed from the Z direction, and the separation portion 141 which is provided in either end of the bonding portion 140 in the X direction and separated while being expanded to the outside in the X direction when the two side surfaces are butted. With this configuration, when the two side surfaces S1 and S2 abut on each other in the abutting process, the two side surfaces S1 and S2 do not come in point contact with the tenth upper die 181. Therefore, it is possible to prevent partial friction of the tenth upper die 181, and the tenth upper die 181 can be used for a long time. In addition, the workpiece W0 can be obtained from the base plate B with efficiency, and a yield of the material is improved.

Further, the invention is not limited to the above-mentioned embodiments, but various modifications can be made within a scope of claims.

For example, in the manufacturing method of the suspension arms 1 and 2 according to the above-mentioned embodiments, the description has been made about that the vulnerable portion forming process is performed after the piercing process is completed, but the invention is not limited thereto. Therefore, the vulnerable portion forming process may be performed at any timing as long as it is performed after the abutting process.

In addition, the description has been made about that the bonding by welding is performed in the abutting process, but the invention is not limited thereto. Therefore, the bonding by welding may be performed at any timing as long as it performed after the abutting process.

Figure 30:
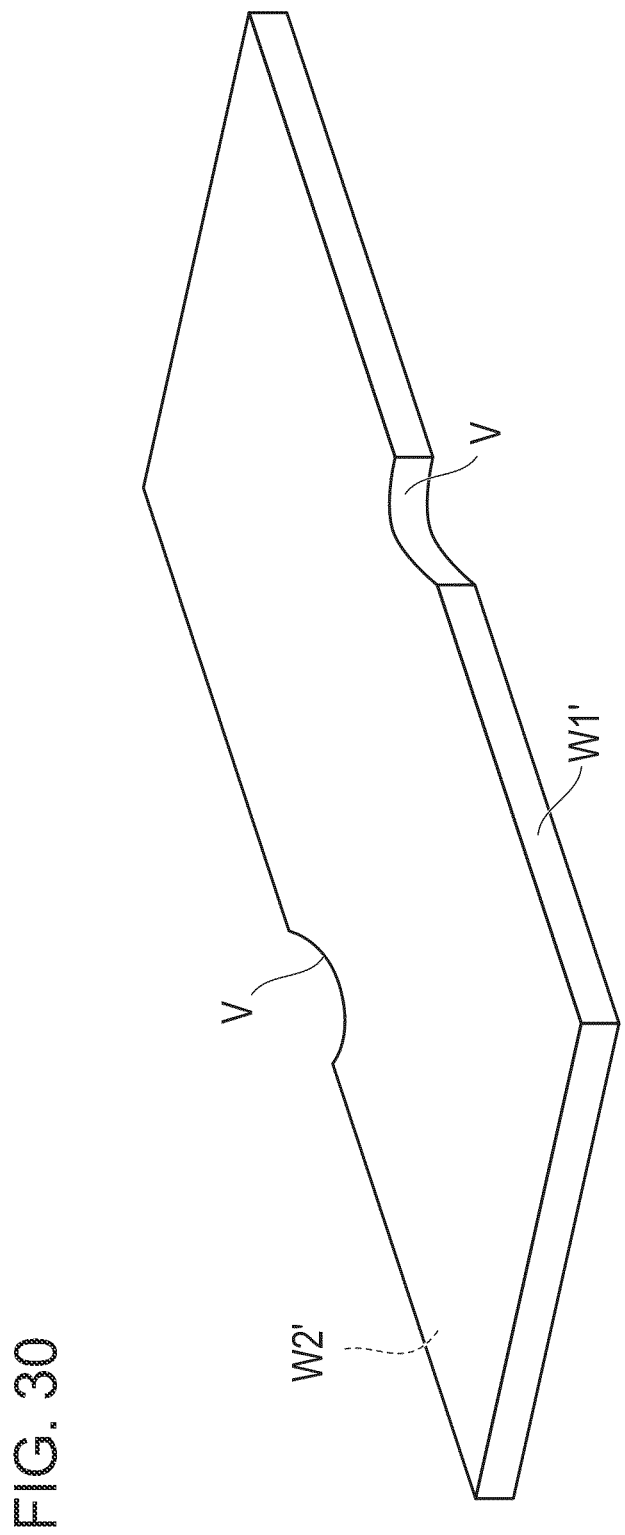
FIG. 30 is a diagram illustrating a modified example of the suspension arm according to the embodiment.

In addition, the above-mentioned first embodiment has been described about that the vulnerable portion 11 is formed in the vulnerable portion forming process by cutting the vicinity of the center of the cylindrical portion 10, but the invention is not limited thereto. As illustrated in FIG. 30, notches V may be previously provided in the workpiece W (the flat plate), and two side surfaces W1' and W2' having the notches V may be butted and jointed to each other. At this time, since the previously-formed notches are butted and jointed to each other to form the peripheral wall hole, the pierce processing is not necessary, so that the peripheral wall hole can be easily formed.

In addition, the above-mentioned first embodiment has been described about that the vulnerable portion 11 is formed by the peripheral wall hole formed in the peripheral wall of the cylindrical portion 10, but the invention is not limited thereto. As illustrated in FIG. 31, the bonding portion 40 to which the two side surfaces W1 and W2 are butted and jointed is subjected to the welding except a non-welding portion NS, and a vulnerable portion 11' is formed by the non-welding portion NS. At this time, since the pierce processing is not performed, the vulnerable portion 11' can be easily formed.

In addition, the above-mentioned first and second embodiments have been described to be used as the suspension arms 1 and 2, but the invention may be similarly applied even to any vehicular component in a long arm shape such as a clutch pedal arm, a radius rod, or a trailing arm.

REFERENCE SIGNS LIST 1, 2: Suspension arm
10: Cylindrical type
11, 11': Vulnerable portion
20, 120: Bracket portion
30, 130: Flange portion
40, 140: Bonding portion
141: Separation portion
B: Base plate
F1, F2: Part of two side portions
N, N1, N5, N6: Core
NP: Non-extrusion portion
NS: Non-welding portion
P, P5: Extrusion portion
V: Notch
W, W0: Workpiece
W1, W2, W1', W2', S1, S2: Two side surfaces
W3: Abutment portion
W4, W5: Rectangular portion

The invention claimed is:
1. A vehicular arm component which is formed by subjecting a workpiece, the workpiece being a flat plate extending in a plane formed by a first direction and a second direction orthogonal to the first direction, to press processing in stages so as to butt and joint two side surfaces in the second direction, comprising:
a cylindrical portion configured to be provided along the first direction and have a cylindrical shape;
a bracket portion configured to be provided in either end in the first direction of the cylindrical portion and have an outer diameter expanding as it goes to the outside in the first direction; and
two flange portions configured to be provided to face each other along the second direction in the bracket portion and provided with through holes at positions facing each other along the second direction,
wherein the through hole is extended in a direction intersecting with the two side surfaces which are butted and jointed.

2. The vehicular arm component according to claim 1,
wherein the two side surfaces include,
when viewed from a third direction orthogonal to the
plane,
a bonding portion configured to be butted and jointed, and
a separation portion configured to be provided in either
end of the first direction of the bonding portion and be
separated while being expanded to the outside in the
first direction.

3. The vehicular arm component according to claim 1,
wherein the cylindrical portion includes a vulnerable
portion which is vulnerable in rigidity compared to the
other portions of the cylindrical portion.

4. The vehicular arm component according to claim 3,
wherein the vulnerable portion is formed by a peripheral
wall hole which is formed in a peripheral wall of the
cylindrical portion.

5. The vehicular arm component according to claim 4,
wherein the peripheral wall hole is formed by butting and
jointing notches which are formed in the two side
surfaces each.

6. The vehicular arm component according to claim 3,
wherein a bonding portion where the two side surfaces are
butted and jointed is subjected to welding except a
non-welding portion, and
wherein the vulnerable portion is formed by the non-
welding portion.

7. The vehicular arm component according to claim 1,
wherein an expanding rate α expressed by α=(d2−d1)/L
is smaller than ⅓,
where, d1 is a diameter of an end portion of the cylindrical
portion, d2 is a maximum diameter of the bracket
portion, and L is a distance from the end portion of the
cylindrical portion to a position of the maximum diam-
eter of the bracket portion.

8. A manufacturing method of a vehicular arm component
which is manufactured in a hollow shape by subjecting a
workpiece, the workpiece being a flat plate extending in a
first plane formed by a first direction and a second direction
orthogonal to the first direction, to press processing in stages
so as to butt and joint two side surfaces of the workpiece in
a second plane formed by the first direction and a third
direction orthogonal to the first plane, comprising:
forming an extrusion portion which is extruded in the
third direction and is extended while being expanded to
the outside in the first direction in a third plane formed
by the second direction and the third direction except a
non-extrusion portion of the workpiece;
making the two side surfaces abut on each other by
subjecting the non-extrusion portion to the press pro-
cessing along a bending shape of the extrusion portion
in the third plane;
forming a rectangular portion in either end in the first
direction by performing the press processing in a state
where cores are disposed in either end in the first
direction;
cutting parts of two side portions in the third direction of
the rectangular portion;
forming two flange portions along the second direction by
subjecting the rectangular portion with a cut parts of the
two side portions to notch processing; and
forming through holes at positions facing each other along
the second direction of the two flange portions in a
direction intersecting with the two side surfaces which
are butted and jointed to each other by subjecting the
rectangular portion with two flange portions formed to
pierce processing.

9. A manufacturing method of a vehicular arm component
which is manufactured in a hollow shape by subjecting a
workpiece, the workpiece being a flat plate extending in a
first plane formed by a first direction and a second direction
orthogonal to the first direction, to press processing in stages
so as to butt and joint two side surfaces of the workpiece in
a second plane formed by the first direction and a third
direction orthogonal to the first plane, comprising:
forming an extrusion portion by subjecting the workpiece
to the press processing, the extrusion portion being
extruded in the third direction in a third plane formed
by the second direction and the third direction and
being extended while being expanded to the outside in
the first direction;
forming a rectangular portion in either end in the first
direction while making the two side surfaces abut on
each other by subjecting the workpiece to the press
processing in a state where a pair of cores is inserted to
the workpiece from both sides in the first direction; and
forming through holes by subjecting the rectangular por-
tion to pierce processing at positions facing each other
along the second direction of the rectangular portion.

10. The manufacturing method of the vehicular compo-
nent according to claim 8, further comprising:
cutting a base plate, the base plate being a rectangular flat
plate, to form the workpiece which is substantially
parallel to the first direction in the vicinity of the center
in the first direction, and substantially parallel to the
first direction in the vicinity of either end while being
expanded to the outside in the first direction when
viewed from the third direction, before the forming of
the extrusion portion,
wherein the two side surfaces includes,
when being butted and jointed to each other and viewed
from the third direction,
a bonding portion configured to be butted and jointed, and
a separation portion configured to be provided in either
end of the first direction of the bonding portion and be
separated while being expanded to the outside in the
first direction.

11. The manufacturing method of the vehicular arm
component according to claim 8, further comprising:
forming a vulnerable portion which is vulnerable in
rigidity compared to the other portions after the abut-
ting of the two side surfaces.

12. The manufacturing method of the vehicular aim
component according to claim 11,
wherein after the two side surfaces abut on each other, an
abutment portion on which the two side surfaces abut
is subjected to welding except a non-welding portion,
and the vulnerable portion is formed by the non-
welding portion.

13. The vehicular arm component according to claim 2,
wherein the cylindrical portion includes a vulnerable
portion which is vulnerable in rigidity compared to the
other portions of the cylindrical portion.

14. The vehicular arm component according to claim 2,
wherein an expanding rate α expressed by α=(d2−d1)/L
is smaller than ⅓,
where, d1 is a diameter of an end portion of the cylindrical
portion, d2 is a maximum diameter of the bracket
portion, and L is a distance from the end portion of the
cylindrical portion to a position of the maximum diam-
eter of the bracket portion.

15. The vehicular arm component according to claim 3,
wherein an expanding rate α expressed by α=(d2−d1)/L
is smaller than ⅓, where, d1 is a diameter of an end portion of the cylindrical portion, d2 is a maximum diameter of the bracket portion, and L is a distance from the end portion of the cylindrical portion to a position of the maximum diameter of the bracket portion.

16. The vehicular arm component according to claim 4, wherein an expanding rate α expressed by α=(d2−d1)/L is smaller than ⅓,
where, d1 is a diameter of an end portion of the cylindrical portion, d2 is a maximum diameter of the bracket portion, and L is a distance from the end portion of the cylindrical portion to a position of the maximum diameter of the bracket portion.

17. The vehicular aim component according to claim 5, wherein an expanding rate α expressed by α=(d2−d1)/L is smaller than ⅓,
where, d1 is a diameter of an end portion of the cylindrical portion, d2 is a maximum diameter of the bracket portion, and L is a distance from the end portion of the cylindrical portion to a position of the maximum diameter of the bracket portion.

18. The vehicular arm component according to claim 6, wherein an expanding rate α expressed by α=(d2−d1)/L is smaller than ⅓,
where, d1 is a diameter of an end portion of the cylindrical portion, d2 is a maximum diameter of the bracket portion, and L is a distance from the end portion of the cylindrical portion to a position of the maximum diameter of the bracket portion.

19. The manufacturing method of the vehicular arm component according to claim 9, further comprising:
cutting a base plate, the base plate being a rectangular flat plate, to form the workpiece which is substantially parallel to the first direction in the vicinity of the center in the first direction, and substantially parallel to the first direction in the vicinity of either end while being expanded to the outside in the first direction when viewed from the third direction, before the forming of the extrusion portion,
wherein the two side surfaces includes,
when being butted and jointed to each other and viewed from the third direction,
a bonding portion configured to be butted and jointed, and
a separation portion configured to be provided in either end of the first direction of the bonding portion and be separated while being expanded to the outside in the first direction.

20. The manufacturing method of the vehicular arm component according to claim 9, further comprising:
forming a vulnerable portion which is vulnerable in rigidity compared to the other portions after the abutting of the two side surfaces.

21. The manufacturing method of the vehicular arm component according to claim 10, further comprising:
forming a vulnerable portion which is vulnerable in rigidity compared to the other portions after the abutting of the two side surfaces.

* * * * *